United States Patent
Baba

(10) Patent No.: US 10,317,676 B2
(45) Date of Patent: Jun. 11, 2019

(54) HEAD-UP DISPLAY DEVICE

(71) Applicant: FUJIFILM Corporation, Tokyo (JP)

(72) Inventor: Tomoyuki Baba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 143 days.

(21) Appl. No.: 15/664,049

(22) Filed: Jul. 31, 2017

(65) Prior Publication Data
US 2018/0059418 A1 Mar. 1, 2018

(30) Foreign Application Priority Data

Aug. 31, 2016 (JP) .................. 2016-169021

(51) Int. Cl.
*G02B 27/01* (2006.01)
*B60K 35/00* (2006.01)
*B60K 37/02* (2006.01)
*G02B 5/02* (2006.01)
*G02B 7/182* (2006.01)
*G03B 21/28* (2006.01)
*G03B 21/10* (2006.01)
(Continued)

(52) U.S. Cl.
CPC .......... *G02B 27/0149* (2013.01); *B60K 35/00* (2013.01); *B60K 37/02* (2013.01); *G02B 5/0273* (2013.01); *G02B 7/182* (2013.01); *G02B 27/0101* (2013.01); *G03B 21/10* (2013.01); *G03B 21/28* (2013.01); *G03B 21/62* (2013.01); *G03B 29/00* (2013.01); *B60K 2350/1072* (2013.01); *B60K 2350/2052* (2013.01); *B60K 2350/352* (2013.01); *G02B 2027/011* (2013.01); *G02B 2027/015* (2013.01); *G02B 2027/0145* (2013.01); *G02B 2027/0154* (2013.01); *G03B 21/142* (2013.01)

(58) Field of Classification Search
None
See application file for complete search history.

(56) References Cited

U.S. PATENT DOCUMENTS

2007/0058269 A1* 3/2007 Mann ................. G02B 17/0663
359/726
2010/0149073 A1* 6/2010 Chaum .............. G02B 27/0093
345/8
(Continued)

FOREIGN PATENT DOCUMENTS

JP 2013-061554 A 4/2013

*Primary Examiner* — Jennifer D. Carruth
(74) *Attorney, Agent, or Firm* — Studebaker & Brackett PC

(57) ABSTRACT

A head-up display device is improved in performance by a reduction in size and the satisfactory correction of optical aberration. A head-up display device includes an image display surface that displays an image, a reflective optical surface that is disposed at a position facing an predetermined observation position of an observer, and a projection optical system that projects the image displayed on the image display surface to the reflective optical surface disposed at the predetermined observation position and allows the observer to visually recognize the enlarged image as a virtual image. In a case in which an optical path, which extends from a center of the image display surface and reaches a center of an eye box, is referred to as an optical axis, the projection optical system includes a first mirror and a second mirror in this order from the image display surface and Conditional Expression (1) is satisfied.

7 Claims, 13 Drawing Sheets

EXAMPLE 1

(51) Int. Cl.
*G03B 21/62* (2014.01)
*G03B 29/00* (2006.01)
*G03B 21/14* (2006.01)

(56) References Cited

U.S. PATENT DOCUMENTS

2018/0059415 A1* 3/2018 Baba .................... G02B 26/105
2018/0059418 A1* 3/2018 Baba .................... G03B 21/10

* cited by examiner

EXAMPLE 1

EXAMPLE 1

EXAMPLE 2

EXAMPLE 2

EXAMPLE 4

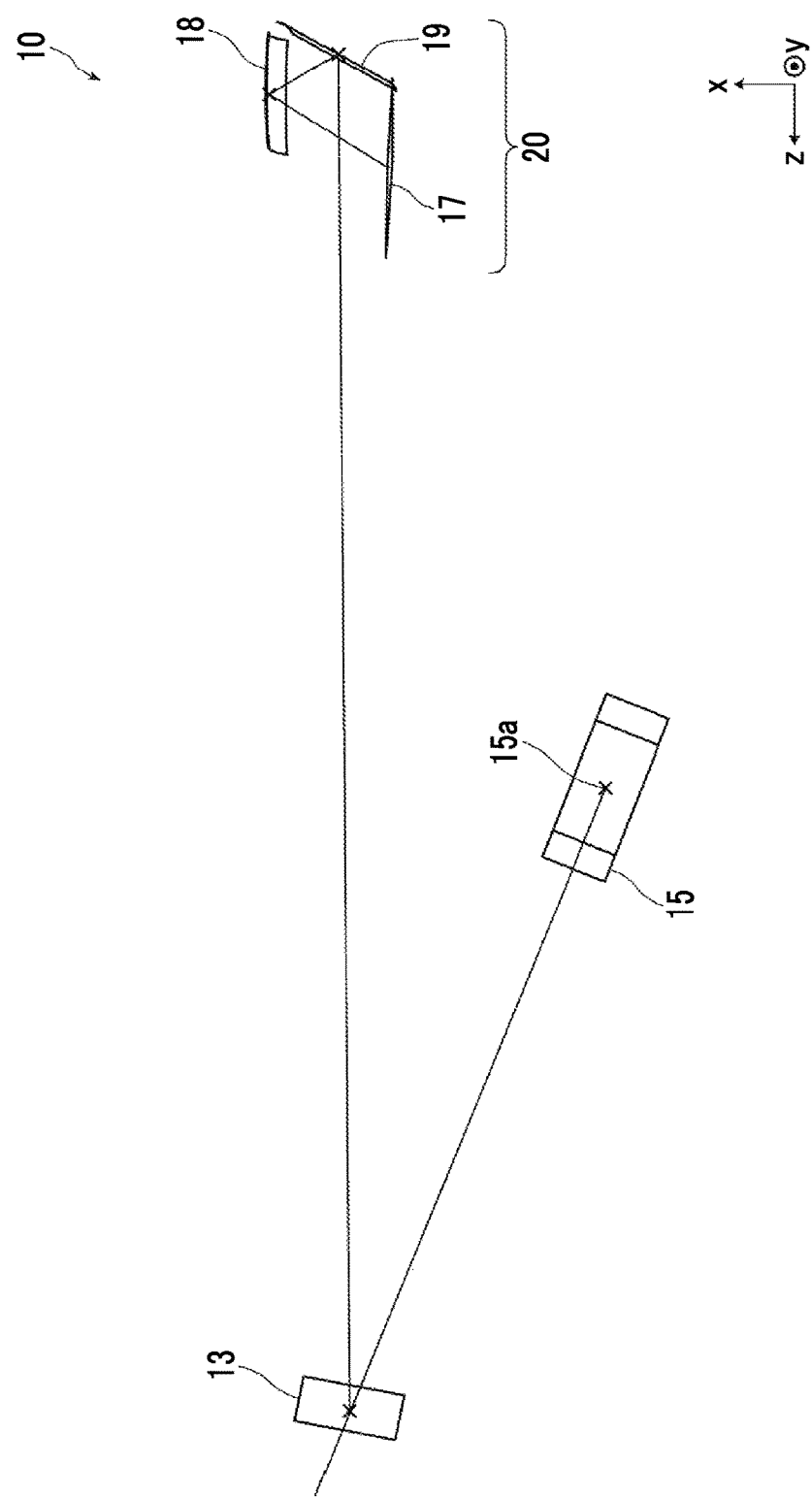

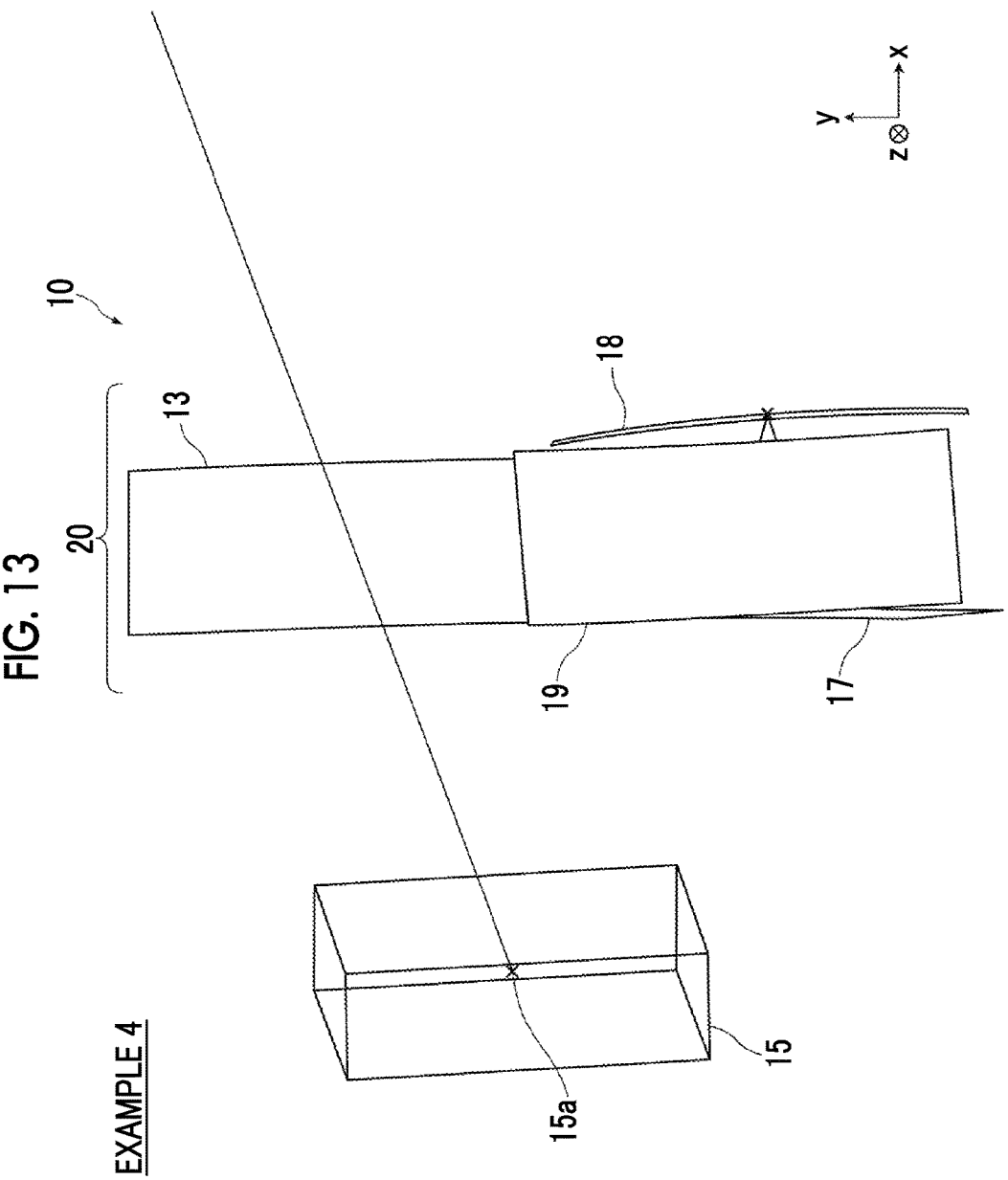

HEAD-UP DISPLAY DEVICE

CROSS-REFERENCE TO RELATED APPLICATIONS

The present application claims priority under 35 U.S.C. § 119 to Japanese Patent Application No. 2016-169021, filed on Aug. 31, 2016. Each of the above application(s) is hereby expressly incorporated by reference, in its entirety, into the present application.

BACKGROUND OF THE INVENTION

1. Field of the Invention

The present invention relates to a head-up display device for a moving body, such as an automobile or the like, and more particularly, to a head-up display device for a large vehicle.

2. Description of the Related Art

In the past, a head-up display device has been known as a device that displays information, such as the indication of a direction, calling for attention, and a travel speed, to a driver of an automobile or the like. The head-up display device is to project the virtual image of an image, which is to be displayed, to the reflective optical surface of a front window, a combiner, or the like so that a driver can recognize information required for the driving of an automobile or the like without taking his eyes off from the field of view. JP2013-61554A is proposed as such a head-up display device. JP2013-61554A discloses a head-up display device in which an image forming unit mounted on a vehicle, such as a passenger car, is disposed in front of a driver so that the driver can visually recognize an enlarged virtual image of a two-dimensional image formed on an image display surface by a first mirror, a second mirror, and a reflective optical surface.

SUMMARY OF THE INVENTION

It is desired that the movement of the line of sight of a driver at the time of confirming information displayed by the head-up display device is reduced for safety or the prevention of driver's eyestrain in the head-up display device. In order to reduce the movement of the line of sight of a driver, it is preferable that the focal position of the virtual image is distant from the driver as much as possible. The length of an optical path between the image display surface and the reflective optical surface in the head-up display device needs to be long to make this structure.

In recent years, head-up display devices to be mounted on not only a passenger car but also large vehicles, such as a bus, a truck, a ship, and a heavy machine, have been desired to be developed. A space in which the head-up display device can be disposed in the large vehicle is different from that in a passenger car, and the head-up display device can also be disposed on the rear side or lateral side of a driver's seat, on the ceiling, or the like. According to the arrangement, since the length of an optical path between the reflective optical surface, which is disposed in front of an observer, and the image display surface in the head-up display device can be increased, it is easy to make the focal position of the virtual image be distant from the driver.

However, the head-up display device needs to be reduced in size to increase the degree of freedom of arrangement of the head-up display device as described above.

Further, since an improvement in performance is further required for the head-up display device, it is desired that optical aberration is satisfactorily corrected for an improvement in performance.

The invention has been made in consideration of the above-mentioned circumstances, and an object of the invention is to provide a head-up display device that can be improved in performance by a reduction in size and the satisfactory correction of optical aberration.

A head-up display device of the invention comprises a projection optical system that projects an image displayed on an image display surface to a reflective optical surface disposed at a position facing an predetermined observation position of an observer and allows the observer to visually recognize the enlarged image as a virtual image. In a case in which an optical path, which extends from a center of the image display surface and reaches a center of an eye box, is referred to as an optical axis, the projection optical system includes a first mirror and a second mirror in this order from the image display surface and Conditional Expression (1) is satisfied, $$0.05 < \varphi_3/|\varphi_{12}| < 0.3 \tag{1}$$

where, $\varphi_3$: power of the reflective optical surface near the optical axis, and $\varphi_{12}$: power of a combined optical system of the first and second mirrors.

The "eye box" of the invention means a range in which an observer appropriately can observe the virtual image in a state in which the head-up display device is fixed.

Further, the "image display surface" of the invention includes not only the image display surface of an image display element itself but also an image display surface of a diffusion member in a case in which an image displayed on the image display element is temporarily projected to the diffusion member, such as a diffuser or the like, to enlarge the eye box.

It is preferable that the head-up display device of the invention satisfies any one of Conditional Expressions (1-1) to (2-1). As a preferable aspect, the head-up display device of the invention may satisfy any one of Conditional Expressions (1-1) to (2-1) or may satisfy an arbitrary combination thereof, $$0.1 < \varphi_3/|\varphi_{12}| < 0.2 \tag{1-1}$$

$$2 < \varphi_{12} * L_3 < 10 \tag{2}$$

$$3 < \varphi_{12} * L_3 < 5 \tag{2-1}$$

where, $L_3$: a gap between the second mirror and the reflective optical surface on the optical axis.

In the head-up display device of the invention, it is preferable that an angle of luminous flux toward the reflective optical surface from the projection optical system is made variable by movement of at least one mirror selected from the first and second mirrors.

Furthermore, in the head-up display device of the invention, it is more preferable that the angle of luminous flux toward the reflective optical surface from the projection optical system is made variable by movement of the mirror, which is disposed at a position closest to the center of the eye box, of the first and second mirrors.

In the invention, "movement of the mirror" means a change in the movement of the mirror, such as the movement of the mirror itself, a change in the inclination of the mirror, and the rotation of the mirror about the optical axis.

Moreover, in the head-up display device of the invention, the image may be an image that is formed as an intermediate image on the basis of image information by an optical system.

In this case, the head-up display device may further comprise a diffuser that is provided on the image display surface present at a formation position of the intermediate image.

In the invention, the "projection optical system" means an optical system between the image display surface and the second mirror, and the "optical system" means an optical system that is positioned on the opposite side to the first and second mirrors with the image display surface sandwich therebetween.

The head-up display device of the invention comprises a projection optical system that projects an image displayed on an image display surface to a reflective optical surface disposed at a position facing an predetermined observation position of an observer and allows the observer to visually recognize the enlarged image as a virtual image. In a case in which an optical path, which extends from a center of the image display surface and reaches a center of an eye box, is referred to as an optical axis, the projection optical system includes a first mirror and a second mirror in this order from the image display surface and Conditional Expression (1) is satisfied. Accordingly, it is possible to obtain the head-up display device that can be improved in performance by a reduction in size and the satisfactory correction of optical aberration.

$$0.05 < \varphi_3 / |\varphi_{12}| < 0.3 \tag{1}$$

BRIEF DESCRIPTION OF THE DRAWINGS

FIG. 12 is a diagram showing the schematic structure of the head-up display device of Example 4 of the invention seen in the y-axis direction.

FIG. 13 is a diagram showing the schematic structure of the head-up display device of Example 4 of the invention seen in the z-axis direction.

DESCRIPTION OF THE PREFERRED EMBODIMENTS

Figure 1:
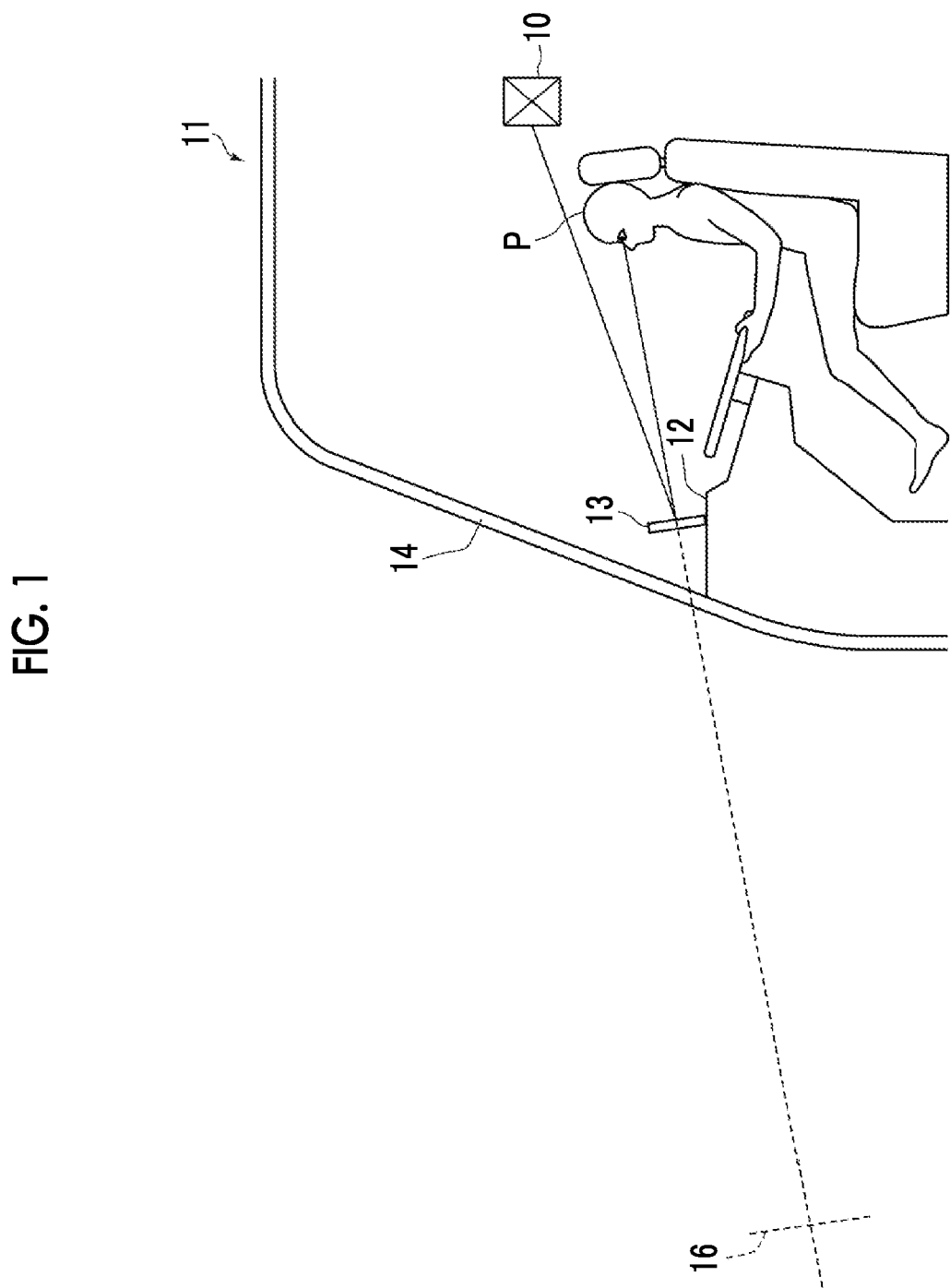
FIG. 1 is a schematic diagram of a driver's seat of a bus on which a head-up display device according to an embodiment of the invention is mounted.
Figure 2:
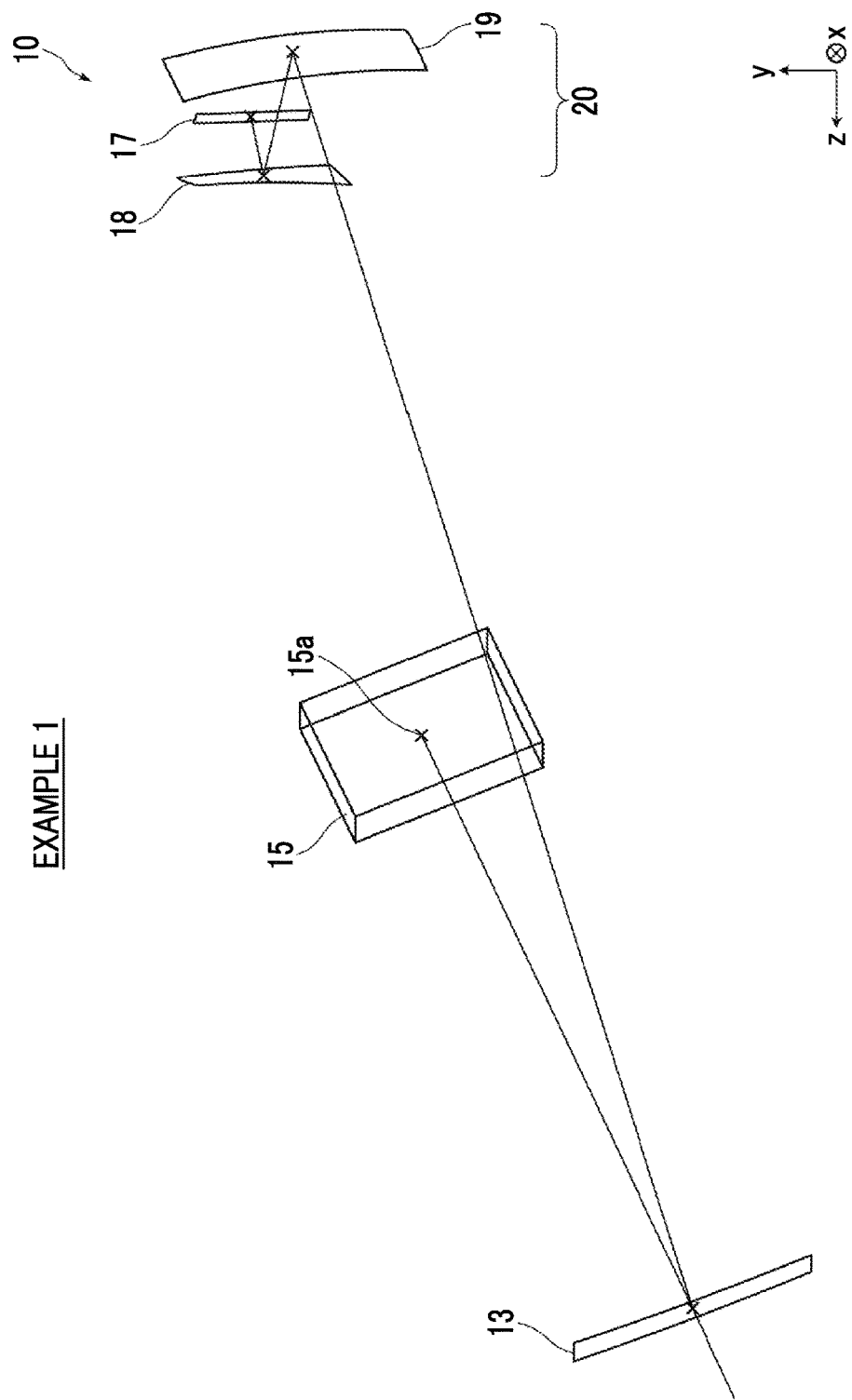
FIG. 2 is a diagram showing the schematic structure of a head-up display device of Example 1 of the invention seen in an x-axis direction.
Figure 3:
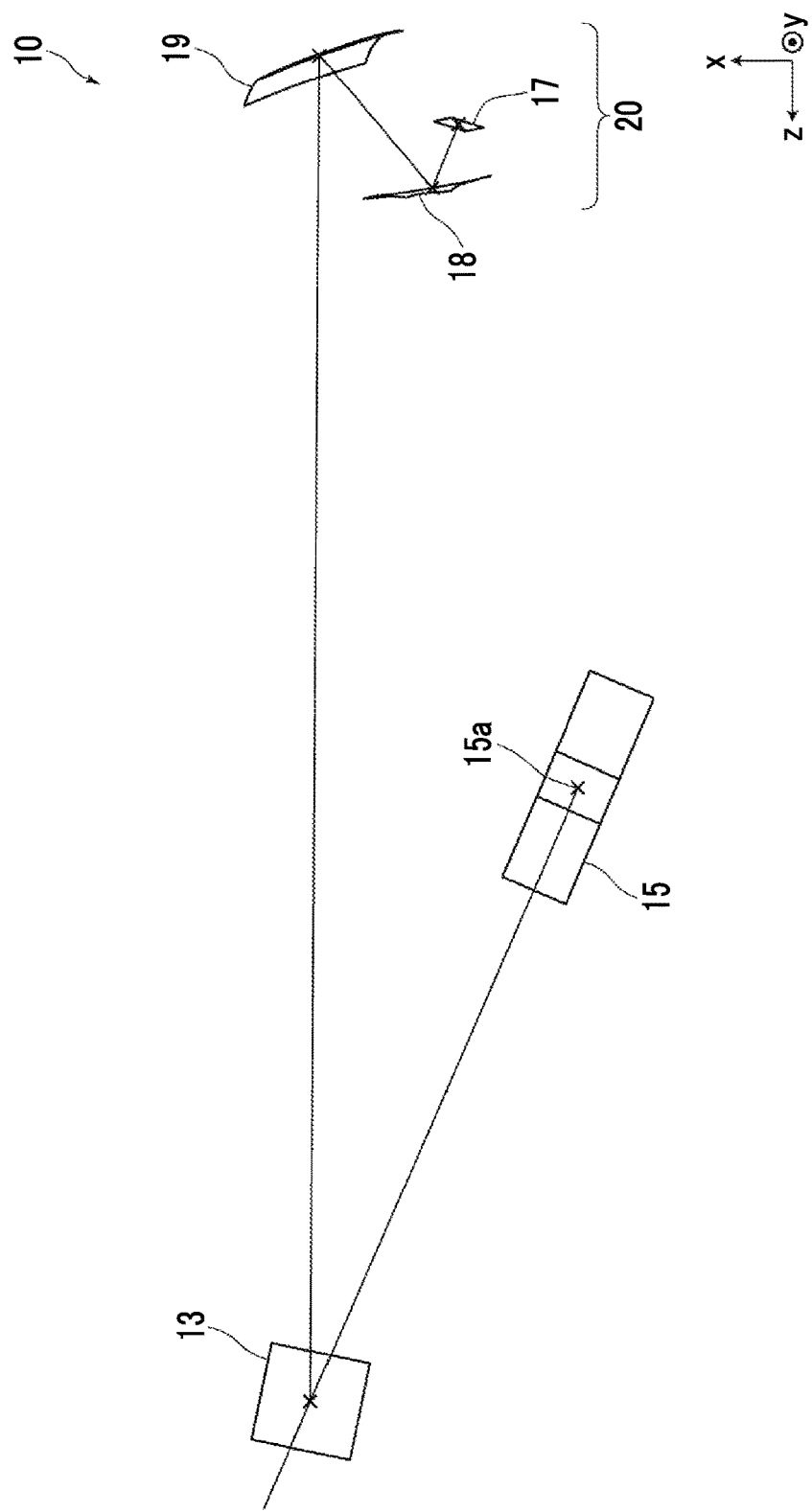
FIG. 3 is a diagram showing the schematic structure of the head-up display device of Example 1 of the invention seen in a y-axis direction.
Figure 4:
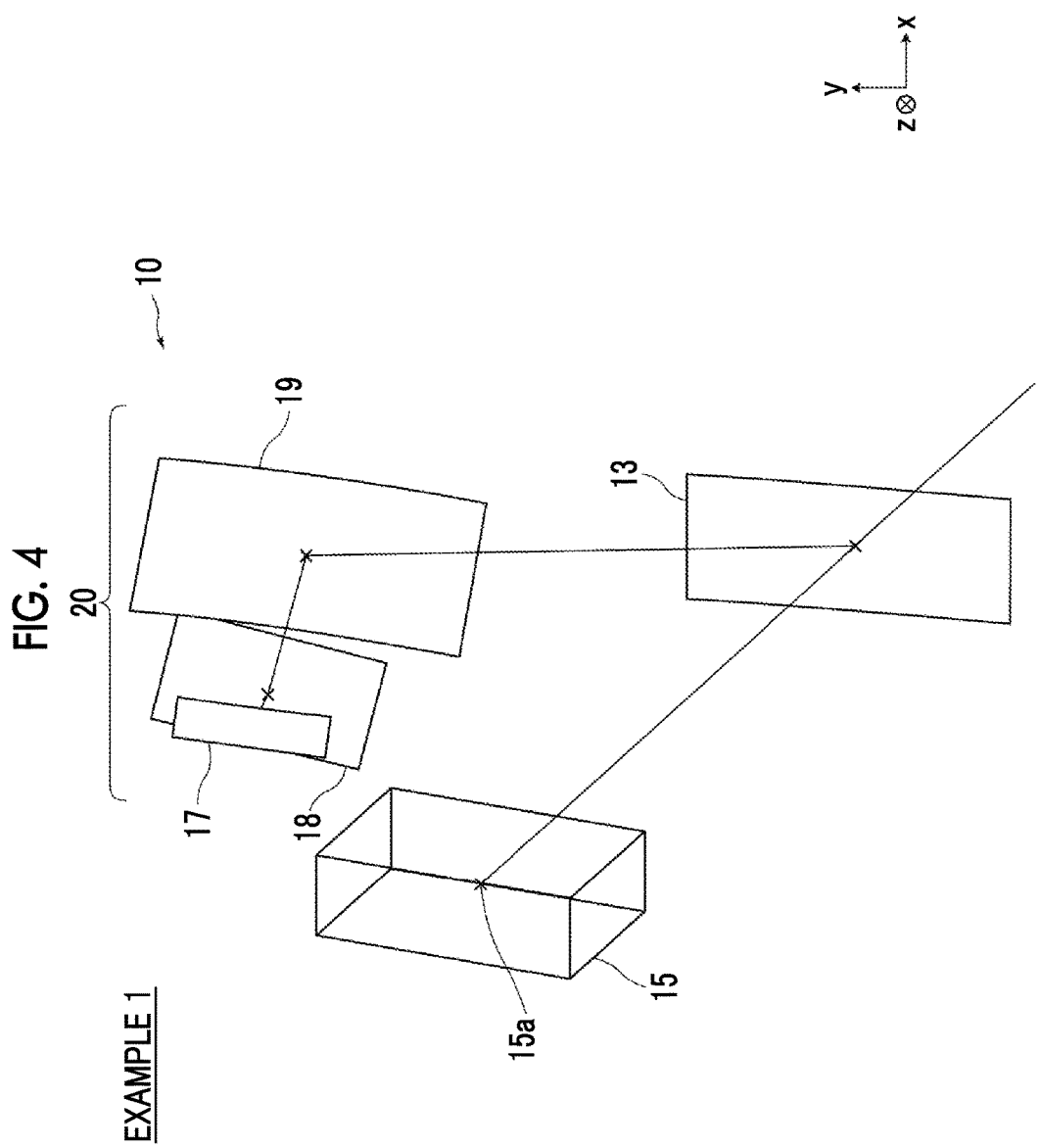
FIG. 4 is a diagram showing the schematic structure of the head-up display device of Example 1 of the invention seen in a z-axis direction.

An embodiment of the invention will be described in detail below with reference to drawings. FIG. 1 is a schematic diagram of a driver's seat of a bus on which a head-up display device according to an embodiment of the invention is mounted, FIG. 2 is a diagram showing the schematic structure of a head-up display device of Example 1 seen in an X-axis direction, FIG. 3 is a diagram showing the schematic structure of the head-up display device of Example 1 seen in a Y-axis direction, and FIG. 4 is a diagram showing the schematic structure of the head-up display device of Example 1 seen in a Z-axis direction. For convenience' sake, this embodiment will be described with reference to the drawings of the head-up display device of Example 1, but the same description as the description of this embodiment can be made even in head-up display devices of Examples 2 to 4.

Further, a head-up display device will be described as a head-up display device, which is mounted on a bus, in the embodiment to be described below. However, the invention is not limited to a head-up display device mounted on a bus, and the head-up display device can be mounted on large vehicles, such as a truck, a ship, and a heavy machine or the like.

As shown in FIG. 1, a head-up display device 10 of this embodiment is disposed in an internal space of a bus 11, that is, on the ceiling of the bus 11, on the rear side or lateral side of a driver's seat, or the like; reflects an image representing information, such as travel speed, emitted from the inside of the head-up display device 10 by a combiner (reflective optical surface) 13 standing on the upper surface of a dashboard 12; and enlarges and displays the image as a virtual image 16 on the front side of a observer (driver) P beyond a front window 14.

An image is reflected by the combiner 13 in this embodiment, but the front window 14 may be made as a reflective optical surface and an image may be directly reflected by the front window 14.

As shown in FIGS. 2 to 4, the head-up display device 10 includes a projection optical system 20 including an image display surface 17 that displays an image, a first mirror 18, and a second mirror 19. In this embodiment, an optical path, which extends from the center of the image display surface 17 and reaches a center 15a of an eye box 15, is referred to as an optical axis. That is, an optical path A that extends from the center of the image display surface 17, is reflected by the combiner 13, and reaches the center 15a of the eye box 15, and an optical path B that passes through the combiner 13 and reaches the virtual image 16 as shown in FIG. 1 are referred to as the optical axis. In this embodiment, the eye box 15 means a range in which an observer P appropriately can observe the virtual image 16 in a state in which the head-up display device 10 is fixed, and the center 15a of the eye box 15 means the center of the range in which the observer P can observe the virtual image 16.

The head-up display device 10 is adapted so that display light emitted from the image display surface 17 is reflected by the first and second mirrors 18 and 19 in this order, and reaches the combiner 13. The projection optical system 20, which includes the image display surface 17, the first mirror 18, and the second mirror 19, is provided inside a device housing, and allows the display light of the image to pass through an opening formed on the device housing. The device housing is not shown in FIGS. 2 to 4.

The image, which is displayed on the image display surface 17, may be an image that is formed as an intermediate image on the basis of image information by an optical system (not shown) positioned on the front side of the projection optical system 20, that is, on the opposite side to the first and second mirrors 18 and 19 with the image display surface 17 sandwich therebetween on the optical axis. In this case, a diffuser may be provided on the image display surface 17 that is present at a formation position of the intermediate image, and the range of the eye box 15 can be enlarged according to this aspect.

Further, the power of the combiner 13 near the optical axis and the power of a combined optical system of the first and second mirrors 18 and 19 are adapted so as to satisfy Conditional Expression (1), $$0.05 < \varphi_3/|\varphi_{12}| < 0.3 \tag{1}$$

where, $\varphi_3$: power of the reflective optical surface near the optical axis, and $\varphi_{12}$: the power of the combined optical system of the first and second mirrors.

Here, Conditional Expression (1) will be described in detail. In this embodiment, the shapes of the reflective surfaces of the first and second mirrors 18 and 19 are expressed by Expression (3), $$z = \frac{C_{\_k} * (x^2 + y^2)}{1 + \sqrt{1 - C_{\_k}^2 * (x^2 + y^2)}} + \sum_{i,j} D_{ij\_k} * x^i * y^j \tag{3}$$

where, x, y, z: coordinates of each surface shape using surface vertexes of image display surface as origins, $C_{\_k}$: the reciprocal of the radius of curvature, and $D_{ij\_k}$: free-form surface coefficient.

k denotes the number of the mirror and k is in the range of 1 to 3 in this embodiment. Further, each of i and j denotes a positive integer and i and j are in the range of 1 to 8 in this embodiment. Furthermore, *, that is, the asterisk of Expression (3) means multiplication.

The surface shape in an x-z cross-section is expressed by Expression (4) in a case in which y is 0 in Expression (3).

$$z = \frac{C_{\_k} * x^2}{1 + \sqrt{1 - C_{\_k}^2 * x^2}} + D_{20\_k} * x^2 + D_{30\_k} * x^3 + \ldots \tag{4}$$

In a case in which z of Expression (4) is f(x), Expression (5) and Expression (6) are obtained.

$$f'(x) = \frac{C_{\_k} * x}{\sqrt{1 - C_{\_k}^2 * x^2}} + 2 * D_{20\_k} * x + 3 * D_{30\_k} * x^2 + \ldots \tag{5}$$

$$f''(x) = \frac{C_{\_k}}{\sqrt{(1 - C_{\_k}^2 * x^2)^3}} + 2 * D_{20\_k} + 6 * D_{30\_k} * x + \ldots \tag{6}$$

Expression (7) is obtained from the Maclaurin series expansion of f(x).

$$f(x) = f(0) + \frac{f'(0)}{1!} * x + \frac{f''(0)}{2!} * x^2 + \frac{f'''(0)}{3!} * x^3 + \ldots \tag{7}$$

However, since x is very small near the optical axis, Expression (8) is obtained in a case in which Expression (7) is approximated with the ignorance of third- or higher-order terms.

$$f(x) = f(0) + \frac{f'(0)}{1!} * x + \frac{f''(0)}{2!} * x^2 = \frac{C_{\_k} + 2 * D_{20\_k}}{2} * x^2 \tag{8}$$

Expression (8) represents that the surface shape in the x-z cross-section corresponds to a paraboloid of which the curvature is $C_{\_k} + 2*D_{20\_k}$. Since the power φ of the reflective optical surface is expressed by "φ=−2*(curvature)", power $\varphi_x$ in the x-z cross-section is expressed by Expression (9).

$$\varphi_x = -2*(C_{\_k} + 2*D_{20\_k}) \tag{9}$$

Likewise, power $\varphi_y$ in a y-z cross-section is expressed by Expression (10).

$$\varphi_y = -2*(C_{\_k} + 2*D_{02\_k}) \tag{10}$$

An average of $\varphi_x$ and $\varphi_y$ is defined as the power $\varphi_k$ of each mirror by Expression (11).

$$\varphi_k = -2*(C_{\_k} + D_{20\_k} + D_{02\_k}) \tag{11}$$

The powers $\varphi_1$ and $\varphi_2$ of the first and second mirrors 18 and 19 near the optical axis are expressed from Expression (11) by Expressions (12) and (13), respectively.

$$\varphi_1 = -2*(C_{\_1} + D_{20\_1} + D_{02\_1}) \tag{12}$$

$$\varphi_2 = -2*(C_{\_2} + D_{20\_2} + D_{02\_2}) \tag{13}$$

Further, in a case in which a gap between the first and second mirrors 18 and 19 on the optical axis is denoted by $L_2$, the power $\varphi_{12}$ of the combined optical system of the first and second mirrors 18 and 19 is expressed by Expression (14).

$$\varphi_{12} = \varphi_1 + \varphi_2 - L_2 * \varphi_1 * \varphi_2 \tag{14}$$

Further, the power $\varphi_3$ of the reflective optical surface near the optical axis is expressed from Expression (11) by Expression (15).

$$\varphi_3 = -2*(C_{\_3} + D_{20\_3} + D_{02\_3}) \tag{15}$$

The value of Conditional Expression (1) is calculated using $\varphi_1$, $\varphi_2$, $\varphi_3$, and $\varphi_{12}$ that are defined as described above.

Conditional Expression (1) determines a preferable numerical range of a ratio of the power $\varphi_3$ of the combiner 13 to the absolute value of the power $\varphi_{12}$ of the combined optical system of the first and second mirrors 18 and 19. Since the projection optical system 20 is increased in size in a case in which the value of Conditional Expression (1) is made too large or too small, it is possible to reduce the size of the projection optical system 20 and to satisfactorily correct the aberration of the projection optical system 20 by respectively setting the powers $\varphi_1$ and $\varphi_2$ of the first and second mirrors 18 and 19, the power $\varphi_3$ of the combiner 13, and the gap $L_2$ between the first and second mirrors 18 and 19 on the optical axis so that the ratio is not equal to or not smaller than the lower limit of Conditional Expression (1). Further, it is possible to reduce the size of the projection optical system 20 and to satisfactorily correct the aberration of the projection optical system 20 by respectively setting the powers $\varphi_1$ and $\varphi_2$ of the first and second mirrors 18 and 19, the power $\varphi_3$ of the combiner 13, and the gap $L_2$ between the first and second mirrors 18 and 19 on the optical axis so that the ratio is not equal to or not larger than the upper limit of Conditional Expression (1). The projection optical system 20 can have more satisfactory characteristics in a case in which Conditional Expression (1-1) is satisfied.

$$0.1 < \varphi_3/|\varphi_{12}| < 0.2 \tag{1-1}$$

Conditional Expression (2) determines a preferable numerical range of a value of the product of the power $\varphi_{12}$ of the combined optical system of the first and second mirrors 18 and 19 and a gap $L_3$ between the second mirror 19 and the combiner 13 on the optical axis. It is possible to reduce the size of the projection optical system 20 and to satisfactorily correct the aberration of the projection optical system 20 by respectively setting the powers $\varphi_1$ and $\varphi_2$ of the first and second mirrors 18 and 19, the gap $L_3$ between the second mirror 19 and the combiner 13 on the optical axis, and the gap $L_2$ between the first and second mirrors 18 and 19 on the optical axis so that the value is not equal to or not smaller than the lower limit of Conditional Expression (2). It is possible to reduce the size of the projection optical system 20 and to satisfactorily correct the aberration of the projection optical system 20 by respectively setting the powers $\varphi_1$ and $\varphi_2$ of the first and second mirrors 18 and 19, the gap $L_3$ between the second mirror 19 and the combiner 13 on the optical axis, and the gap $L_2$ between the first and second mirrors 18 and 19 on the optical axis so that the value is not equal to or not larger than the upper limit of Conditional Expression (2). The projection optical system 20 can have more satisfactory characteristics in a case in which Conditional Expression (2-1) is satisfied.

$$3 < \varphi_{12} * L_3 < 5 \tag{2-1}$$

It is preferable that the angle of luminous flux toward the combiner 13 from the projection optical system 20 is made variable by the movement of at least one mirror selected from the first and second mirrors 18 and 19 in the head-up display device 10 of this embodiment. According to this structure, an observer (driver) P can correct the deviation of the angle of luminous flux that is caused by a manufacturing error of the projection optical system 20. The observer (driver) P can correct the deviation of the angle of luminous flux while seeing the virtual image 16 by moving the mirror after the projection optical system 20 is installed.

Further, it is preferable that the angle of luminous flux toward the combiner 13 from the projection optical system 20 is made variable by the movement of the mirror, which is disposed at a position closest to the center 15*a* of the eye box 15, of the first and second mirrors 18 and 19 in the head-up display device 10 of this embodiment. According to this structure, the deviation of the angle of luminous flux can be corrected after the projection optical system 20 is installed. Furthermore, since the observer (driver) P can operate the mirror physically closest to a seating position (predetermined observation position), the ease of an operation can be improved.

In this embodiment, for the change of the angle of luminous flux, the mirror may be moved, the inclination of the mirror may be changed, the mirror may be rotated about the optical axis, and the mirror may be moved by a combination thereof.

The head-up display device 10 includes the projection optical system 20 that projects an image displayed on the image display surface 17 to the combiner 13 disposed at a position facing an predetermined observation position of an observer P and allows the observer P to visually recognize the enlarged image as the virtual image 16. In a case in which an optical path, which extends from the center of the image display surface 17 and reaches the center 15*a* of the eye box 15, is referred to as the optical axis, the projection optical system 20 includes the first mirror 18 and the second mirror 19 in this order from the image display surface 17, and Conditional Expression (1) is satisfied. Accordingly, it is possible to obtain the head-up display device that can be improved in performance by a reduction in size and the satisfactory correction of optical aberration.

$$0.05 < \varphi_3/|\varphi_{12}| < 0.3 \tag{1}$$

Next, Examples of numerical values of the head-up display device of the invention will be described. First, a head-up display device of Example 1 will be described.

Table 1 shows the arrangement coordinate data of the respective elements of the head-up display device. Here, combinations of an absolute coordinate system, which uses the center of the image display surface 17 shown in FIGS. 2 to 4 as an origin, and local coordinate systems, which are set on the surfaces of the respective elements, such as the first mirror 18, the second mirror 19, and the combiner 13, will be described.

The local coordinate systems will be set as described below. The origins, an x-axis component vector, a y-axis component vector, and a z-axis component vector of each local coordinate system, are expressed as (x,y,z), (Vx$_x$,Vx$_y$,Vx$_z$), (Vy$_x$,Vy$_y$,Vy$_z$), and (Vz$_x$,Vz$_y$,Vz$_z$) on the absolute coordinate system, respectively. A plane (y-z plane) orthogonal to an x axis is used as the reference plane of each element, and a normal vector to each reference plane corresponds to an x axis of the local coordinate system. A plane (x-z plane) orthogonal to a y axis is used as the reference plane of each element, and a normal vector to each reference plane corresponds to a y axis of the local coordinate system. A plane (x-y plane) orthogonal to a z axis is used as the reference plane of each element, and a normal vector to each reference plane corresponds to a z axis of the local coordinate system.

Further, each of the first mirror 18, the second mirror 19, and the combiner 13 is a mirror having power, and Table 2 shows data about the shapes of the reflective surfaces of the respective mirrors. The shape of the reflective surface of each mirror is expressed by Expression (3). The first mirror 18 corresponds to a case in which k is 1 in Expression (3), the second mirror 19 corresponds to a case in which k is 2 in Expression (3), and the combiner 13 corresponds to a case in which k is 3 in Expression (3). However, since the respective values of the respective mirrors are written in Table 3, a value of k is not written in Table 3.

$$z = \frac{C_{\_k} * (x^2 + y^2)}{1 + \sqrt{1 - C_{\_k}^2 * (x^2 + y^2)}} + \sum_{i,j} D_{ij\_k} * x^i * y^j \tag{3}$$

where, x, y, z: coordinates of each surface shape using surface vertexes of image display surface as origins (mm),
$C_{\_k}$: the reciprocal of the radius of curvature (1/mm), and
$D_{ij\_k}$: free-form surface coefficient.

TABLE 1

EXAMPLE 1

| | COORDINATES OF ORIGINS OF RESPECTIVE SURFACES | | | x AXIS OF LOCAL COORDINATE SYSTEM | | | y AXIS OF LOCAL COORDINATE SYSTEM | | | z AXIS OF LOCAL COORDINATE SYSTEM | | |
|---|---|---|---|---|---|---|---|---|---|---|---|---|
| | x | y | z | Vxx | Vxy | Vxz | Vyx | Vyy | Vyz | Vzx | Vzy | Vzz |
| IMAGE DISPLAY SURFACE | 0.00 | 0.00 | 0.00 | −0.0865 | 0.6282 | −0.7732 | 0.2100 | 0.7702 | 0.6023 | 0.9739 | −0.1103 | −0.1986 |
| FIRST MIRROR | 27.50 | −15.00 | 70.00 | 0.9565 | −0.2461 | 0.1566 | 0.2415 | 0.9692 | 0.0484 | −0.1637 | −0.0085 | 0.9865 |
| SECOND MIRROR | 150.00 | −50.00 | −75.00 | −0.9277 | 0.1716 | −0.3317 | 0.1384 | 0.9829 | 0.1216 | 0.3469 | 0.0669 | −0.9355 |
| REFLECTIVE OPTICAL SURFACE | 154.36 | −519.33 | 1400.00 | 0.9801 | 0.0000 | −0.1987 | 0.0711 | 0.9338 | 0.3506 | 0.1856 | −0.3577 | 0.9152 |
| CENTER OF EYE BOX | −135.00 | −200.00 | 725.00 | 0.9191 | 0.0000 | −0.3940 | 0.1571 | 0.9171 | 0.3665 | 0.3613 | −0.3988 | 0.8429 |
| VIRTUAL IMAGE | 4151.84 | −4930.84 | 10725.00 | 1.0000 | 0.0000 | 0.0000 | 0.0000 | 1.0000 | 0.0000 | 0.0000 | 0.0000 | 1.0000 |

TABLE 2

EXAMPLE 1

| | FIRST MIRROR | SECOND MIRROR | REFLECTIVE OPTICAL SURFACE |
|---|---|---|---|
| C | 2.4495550021E−03 | −3.3680163223E−04 | −1.8123694370E−04 |
| $D_{20}$ | −1.8214469422E−03 | −3.5904233070E−04 | 5.2854702320E−06 |
| $D_{11}$ | −8.7017909731E−04 | 1.7273094903E−05 | −6.4918006193E−06 |
| $D_{02}$ | −8.6097699172E−04 | −3.6834805320E−04 | −9.9609596958E−06 |
| $D_{30}$ | 9.3043865749E−07 | −4.4424134636E−07 | −6.5339952161E−09 |
| $D_{21}$ | −7.8994334886E−07 | −1.8653076038E−07 | −5.5257325934E−09 |
| $D_{12}$ | 1.6144454006E−06 | 2.8029580440E−07 | −1.3634753277E−08 |
| $D_{03}$ | −2.9782366769E−07 | −9.3100890002E−08 | −3.5294924921E−09 |
| $D_{40}$ | −1.8907576445E−09 | −7.2815870486E−10 | 1.1578397395E−10 |
| $D_{31}$ | 3.7352161411E−09 | 1.9262977141E−10 | 1.6289570344E−10 |
| $D_{22}$ | 3.1679222650E−09 | −8.7647225118E−10 | 2.3582174462E−10 |
| $D_{13}$ | 7.7090991815E−09 | 5.6546691526E−10 | 3.8212093384E−12 |
| $D_{04}$ | −1.2031562445E−08 | 3.5022537126E−10 | −8.1604074480E−12 |
| $D_{50}$ | 2.6626204983E−11 | 1.2314877705E−12 | 3.1570899899E−14 |
| $D_{41}$ | −1.3436940238E−11 | 2.2029721328E−13 | 3.2104130044E−13 |
| $D_{32}$ | −3.0073395111E−11 | −8.0172282186E−12 | 1.1140697905E−12 |
| $D_{23}$ | 6.6142362664E−12 | −6.6990160357E−13 | 1.0929481028E−13 |
| $D_{14}$ | 2.4572837147E−11 | −1.8005538048E−12 | 5.2838003867E−14 |
| $D_{05}$ | 1.3480661526E−11 | −1.5424425175E−12 | 2.6460336862E−14 |
| $D_{60}$ | 5.9766398825E−14 | −3.0227922357E−15 | 5.5162569483E−16 |
| $D_{51}$ | −1.1648141724E−13 | −7.2809490062E−15 | −1.4402144301E−15 |
| $D_{42}$ | 8.4284055338E−14 | −8.8841456994E−15 | −1.0317331698E−15 |
| $D_{33}$ | 1.8904975791E−13 | −1.8710543009E−17 | 3.4251045478E−15 |
| $D_{24}$ | 1.8793253436E−13 | −3.2172586325E−14 | 1.5159822593E−15 |
| $D_{15}$ | 2.1911068889E−13 | 1.0583913642E−14 | −6.3795035317E−16 |
| $D_{06}$ | 9.7897514608E−14 | −1.7117911410E−15 | −2.4276625514E−16 |
| $D_{70}$ | 2.0215537157E−16 | 5.7932053262E−18 | 1.9696711496E−18 |
| $D_{61}$ | −8.2810591963E−16 | −1.2985382913E−18 | 5.8196611233E−18 |
| $D_{52}$ | −1.3609388864E−15 | 4.3864577956E−17 | −3.7446545207E−18 |
| $D_{43}$ | −9.5178392208E−16 | 7.0538019089E−18 | 6.2561234185E−18 |
| $D_{34}$ | −1.6453270693E−15 | 5.2301328619E−17 | 1.4637356601E−17 |
| $D_{25}$ | 9.0719130599E−16 | −6.0817356242E−17 | 4.6861369370E−18 |
| $D_{16}$ | 2.8813138304E−15 | 3.8583887686E−18 | 3.2285521038E−18 |
| $D_{07}$ | 3.2019645698E−15 | −2.7113261717E−17 | −1.1161501335E−18 |
| $D_{80}$ | −2.6595530493E−20 | −8.2511126128E−20 | −2.5786076063E−21 |
| $D_{71}$ | −2.0883613761E−18 | 4.0091388511E−20 | −1.8540185155E−20 |
| $D_{62}$ | −1.5340784568E−18 | −2.1111612220E−20 | −4.2956742584E−20 |
| $D_{53}$ | −2.2453138558E−18 | −1.7638298210E−20 | −2.1991590362E−20 |
| $D_{44}$ | 4.2304808201E−20 | −1.8410048844E−19 | −1.0525446825E−20 |
| $D_{35}$ | 5.0551581407E−18 | −2.2687009958E−20 | 3.4781129454E−20 |
| $D_{26}$ | 3.1224362129E−18 | −4.1654319635E−19 | 1.9235251585E−20 |
| $D_{17}$ | 6.2366737433E−18 | 8.1154606908E−20 | 2.5356481643E−21 |
| $D_{08}$ | 3.5031841902E−18 | −3.9769371812E−21 | −1.3242931871E−21 |

Since symbol and meaning of each data mentioned in the description of Example 1 and a method of describing each data are the same as those in the following examples as long as not particularly stated, the repeated description thereof will be omitted below.

Figure 5:
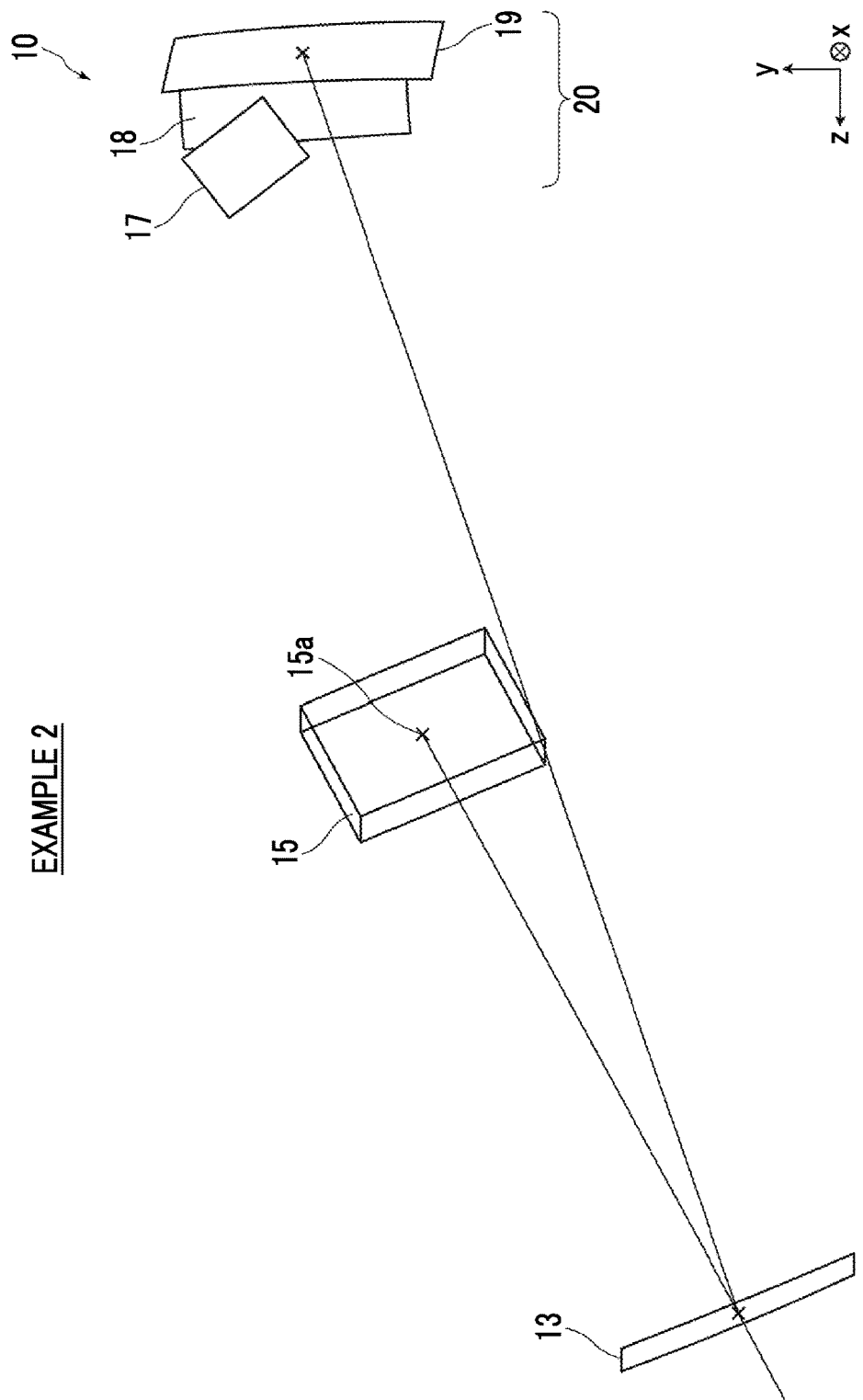
FIG. 5 is a diagram showing the schematic structure of a head-up display device of Example 2 of the invention seen in the x-axis direction.
Figure 6:
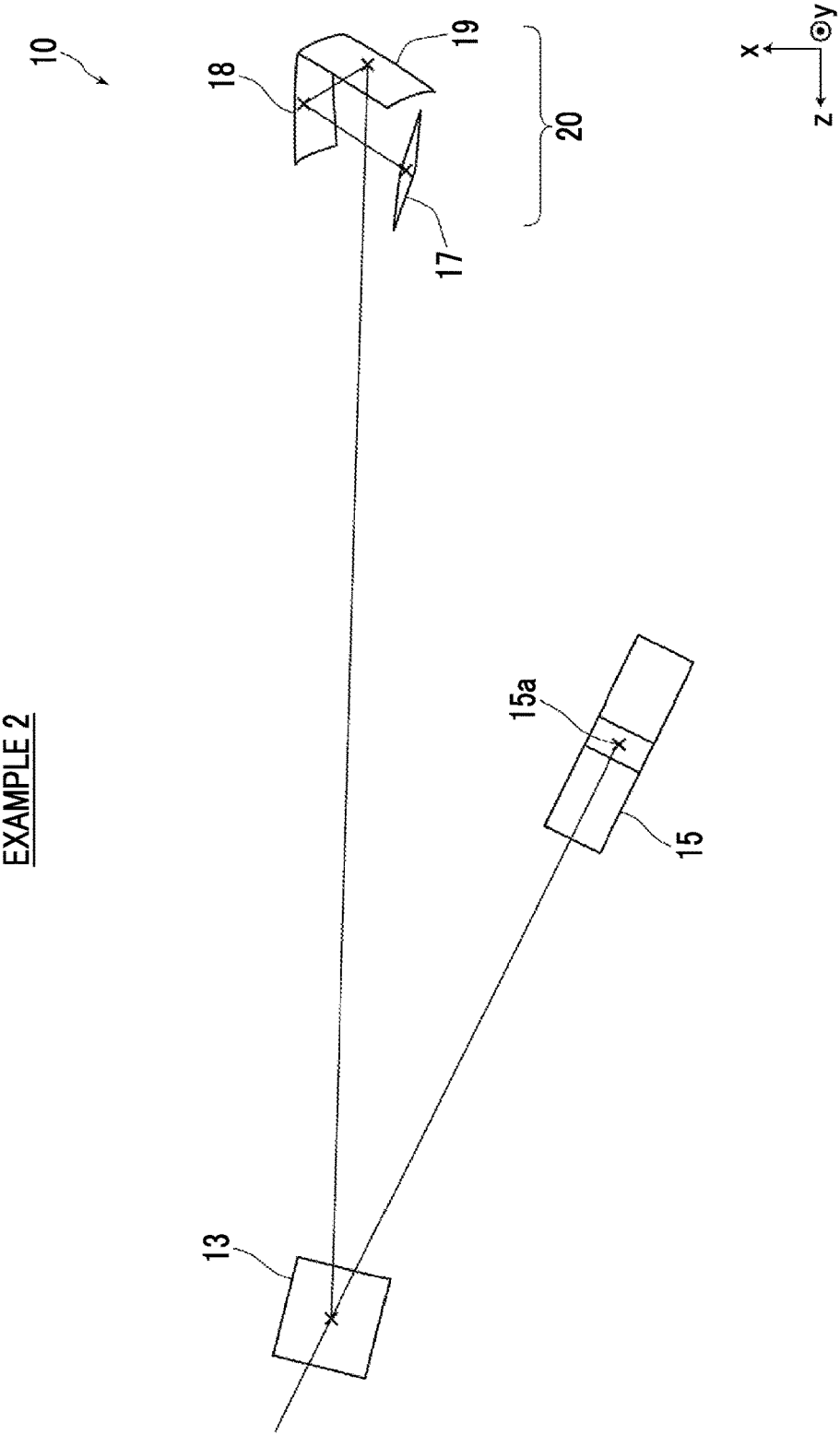
FIG. 6 is a diagram showing the schematic structure of the head-up display device of Example 2 of the invention seen in the y-axis direction.
Figure 7:
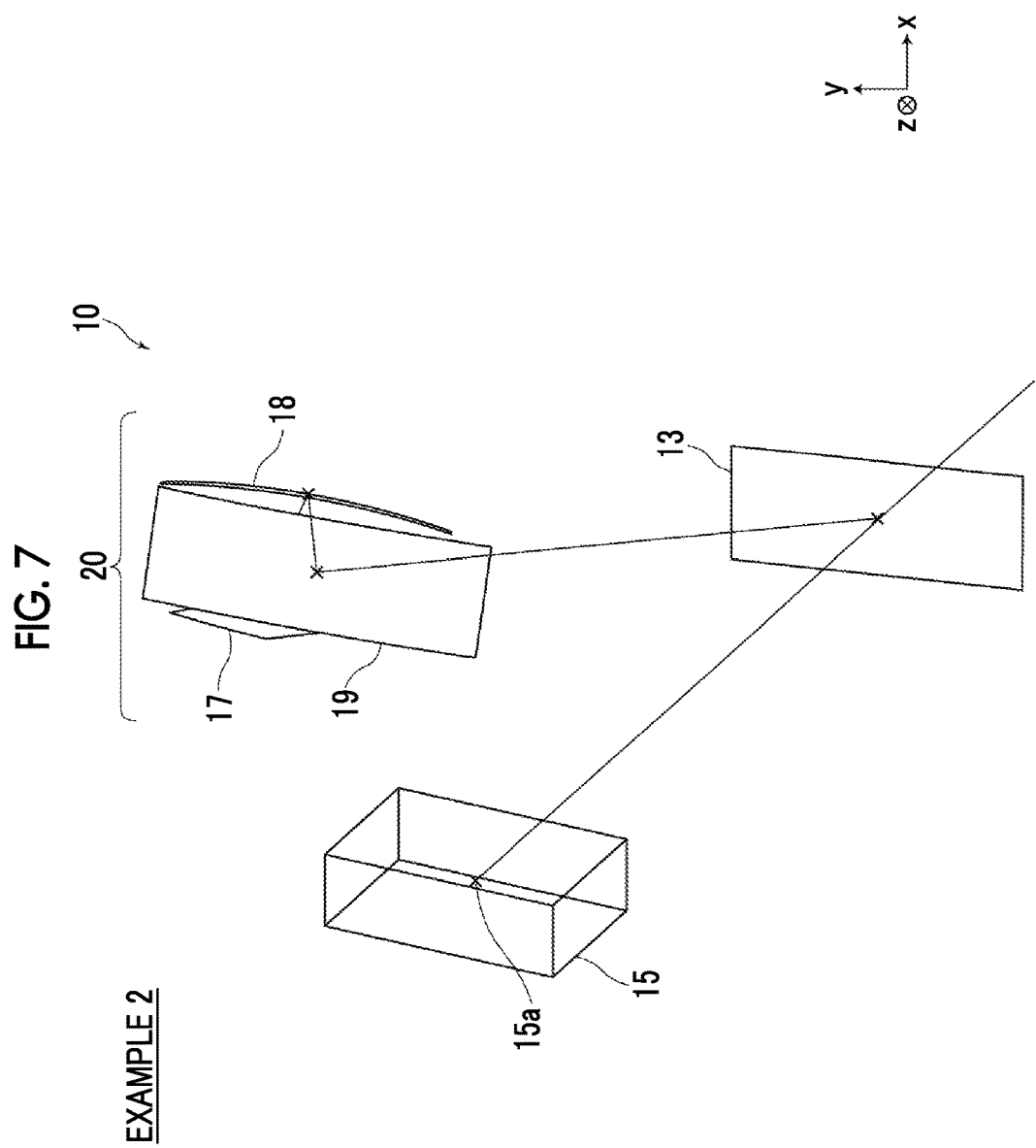
FIG. 7 is a diagram showing the schematic structure of the head-up display device of Example 2 of the invention seen in the z-axis direction.

Next, a head-up display device of Example 2 will be described. FIGS. 5 to 7 are diagrams showing the schematic structure of the head-up display device of Example 2. Further, Table 3 shows the arrangement coordinate data of the respective elements of the head-up display device of Example 2, and Table 4 shows data about the shapes of the reflective surfaces of the respective mirrors.

TABLE 3

EXAMPLE 2

| | COORDINATES OF ORIGINS OF RESPECTIVE SURFACES | | | x AXIS OF LOCAL COORDINATE SYSTEM | | | y AXIS OF LOCAL COORDINATE SYSTEM | | | z AXIS OF LOCAL COORDINATE SYSTEM | | |
|---|---|---|---|---|---|---|---|---|---|---|---|---|
| | x | y | z | Vxx | Vxy | Vxz | Vyx | Vyy | Vyz | Vzx | Vzy | Vzz |
| IMAGE DISPLAY SURFACE | 0.00 | 0.00 | 0.00 | −0.0865 | 0.6282 | −0.7732 | 0.2100 | 0.7702 | 0.6023 | 0.9739 | −0.1103 | −0.1986 |

TABLE 3-continued

EXAMPLE 2

| | COORDINATES OF ORIGINS OF RESPECTIVE SURFACES | | | x AXIS OF LOCAL COORDINATE SYSTEM | | | y AXIS OF LOCAL COORDINATE SYSTEM | | | z AXIS OF LOCAL COORDINATE SYSTEM | | |
|---|---|---|---|---|---|---|---|---|---|---|---|---|
| | x | y | z | Vxx | Vxy | Vxz | Vyx | Vyy | Vyz | Vzx | Vzy | Vzz |
| FIRST MIRROR | 120.00 | −57.50 | −80.00 | 0.0125 | 0.0808 | −0.9966 | 0.1720 | 0.9817 | 0.0818 | 0.9850 | −0.1725 | −0.0016 |
| SECOND MIRROR | 45.00 | −65.00 | −125.00 | −0.8385 | 0.1160 | 0.5325 | 0.1757 | 0.9824 | 0.0627 | −0.5158 | 0.1462 | −0.8441 |
| REFLECTIVE OPTICAL SURFACE | 98.00 | −593.53 | 1350.00 | 0.9696 | 0.0000 | −0.2449 | 0.0981 | 0.9162 | 0.3886 | 0.2243 | −0.4008 | 0.8883 |
| CENTER OF EYE BOX | −245.00 | −215.00 | 675.00 | 0.8915 | 0.0000 | −0.4530 | 0.2026 | 0.8945 | 0.3987 | 0.4052 | −0.4472 | 0.7974 |
| VIRTUAL IMAGE | 4836.48 | −5822.79 | 10675.00 | 1.0000 | 0.0000 | 0.0000 | 0.0000 | 1.0000 | 0.0000 | 0.0000 | 0.0000 | 1.0000 |

TABLE 4

EXAMPLE 2

| | FIRST MIRROR | SECOND MIRROR | REFLECTIVE OPTICAL SURFACE |
|---|---|---|---|
| C | −1.1827231295E−03 | −3.1274062966E−04 | −1.8454964279E−04 |
| $D_{20}$ | −7.0886802901E−05 | −1.6183462824E−05 | −4.5306193754E−06 |
| $D_{11}$ | −1.6410962016E−04 | 2.8782413726E−05 | 3.2525280701E−06 |
| $D_{02}$ | 9.1721035618E−05 | −1.4359033573E−04 | −1.2760124112E−05 |
| $D_{30}$ | −6.2141752331E−07 | −4.3483108768E−07 | −2.1392498016E−09 |
| $D_{21}$ | −5.8242499829E−07 | 2.9069057993E−07 | −8.1907401535E−09 |
| $D_{12}$ | 2.2027915492E−07 | 1.9350341388E−07 | −1.3659858465E−08 |
| $D_{03}$ | 1.9735036813E−07 | −2.1394365333E−07 | −4.3508318498E−09 |
| $D_{40}$ | −4.0614867564E−09 | 4.2211960385E−09 | 8.8427824478E−11 |
| $D_{31}$ | 3.8672597928E−10 | −3.3546006574E−09 | 3.5752039721E−11 |
| $D_{22}$ | 3.7267027632E−09 | −4.0093542278E−09 | 8.7783364029E−11 |
| $D_{13}$ | −5.6801450488E−09 | 1.9332697263E−09 | 2.9790870464E−11 |
| $D_{04}$ | −8.6927415028E−09 | 3.9083044552E−09 | 4.5018104202E−11 |
| $D_{50}$ | −1.0005774655E−11 | −3.9072827201E−11 | 8.0606945507E−15 |
| $D_{41}$ | −3.3021582823E−12 | 5.7538800881E−11 | 2.0408829305E−13 |
| $D_{32}$ | 1.2721971833E−10 | 2.9233337170E−11 | 4.1384185265E−13 |
| $D_{23}$ | −3.1304301153E−11 | −1.9628797803E−11 | 3.2421063286E−13 |
| $D_{14}$ | −3.4135054440E−11 | −4.4206709771E−11 | 3.6641389252E−13 |
| $D_{05}$ | −3.0699948407E−11 | 6.5987281313E−12 | 7.7246802382E−14 |
| $D_{60}$ | 2.1603135159E−13 | 2.2747273168E−13 | −2.5869071851E−15 |
| $D_{51}$ | −3.2858709808E−13 | −3.9472379572E−13 | −8.2971682305E−16 |
| $D_{42}$ | −5.0426635900E−13 | −5.6071021169E−14 | −1.5994744084E−15 |
| $D_{33}$ | 3.7640188150E−13 | 3.6341579150E−15 | −1.2221823119E−15 |
| $D_{24}$ | 5.3070233752E−13 | 1.0765695901E−13 | −9.7854096911E−16 |
| $D_{15}$ | 1.0556867050E−13 | 1.7247524694E−13 | −8.6471215730E−16 |
| $D_{06}$ | −9.6062217823E−14 | 6.3980703850E−14 | −1.3405642123E−15 |

TABLE 4-continued

EXAMPLE 2

| | FIRST MIRROR | SECOND MIRROR | REFLECTIVE OPTICAL SURFACE |
|---|---|---|---|
| $D_{70}$ | −4.4892105664E−15 | −1.3243972036E−15 | 1.2125205598E−18 |
| $D_{61}$ | 3.4400813692E−17 | 9.8632903236E−16 | −3.2992294067E−18 |
| $D_{52}$ | −3.4697471985E−15 | −1.7035576187E−16 | −7.0496719531E−18 |
| $D_{43}$ | 7.8794355945E−16 | −1.0064123569E−15 | −6.2886219333E−18 |
| $D_{34}$ | −8.2192822974E−16 | 2.1645667833E−15 | −4.3385068365E−18 |
| $D_{25}$ | 1.5778706113E−15 | 6.1527631830E−16 | −4.3658348773E−18 |
| $D_{16}$ | 7.8141939809E−16 | 1.1397356111E−15 | −3.4161337049E−18 |
| $D_{07}$ | 7.2137449570E−16 | −1.1505609381E−16 | −9.9579935545E−19 |
| $D_{80}$ | −3.2686579076E−19 | 2.9682628135E−18 | 3.5366078987E−20 |
| $D_{71}$ | 7.6115952145E−18 | −4.2381256827E−18 | 7.1008429915E−21 |
| $D_{62}$ | 5.1913476667E−17 | −4.1720738288E−18 | 1.8097386130E−20 |
| $D_{53}$ | 1.0966861132E−17 | 9.6524918533E−18 | 8.8544346554E−21 |
| $D_{44}$ | 5.5576325046E−18 | −5.8677137577E−18 | −9.7863227228E−22 |
| $D_{35}$ | −1.7977260612E−18 | −3.1075255683E−18 | −1.7731389072E−22 |
| $D_{26}$ | 1.4119536389E−18 | −1.2378772848E−17 | 7.4361022206E−21 |
| $D_{17}$ | 4.8763325855E−18 | −7.4914577875E−18 | 9.1633139304E−21 |
| $D_{08}$ | 8.4056745559E−18 | −3.6996159848E−18 | 1.2577574956E−20 |

Figure 8:
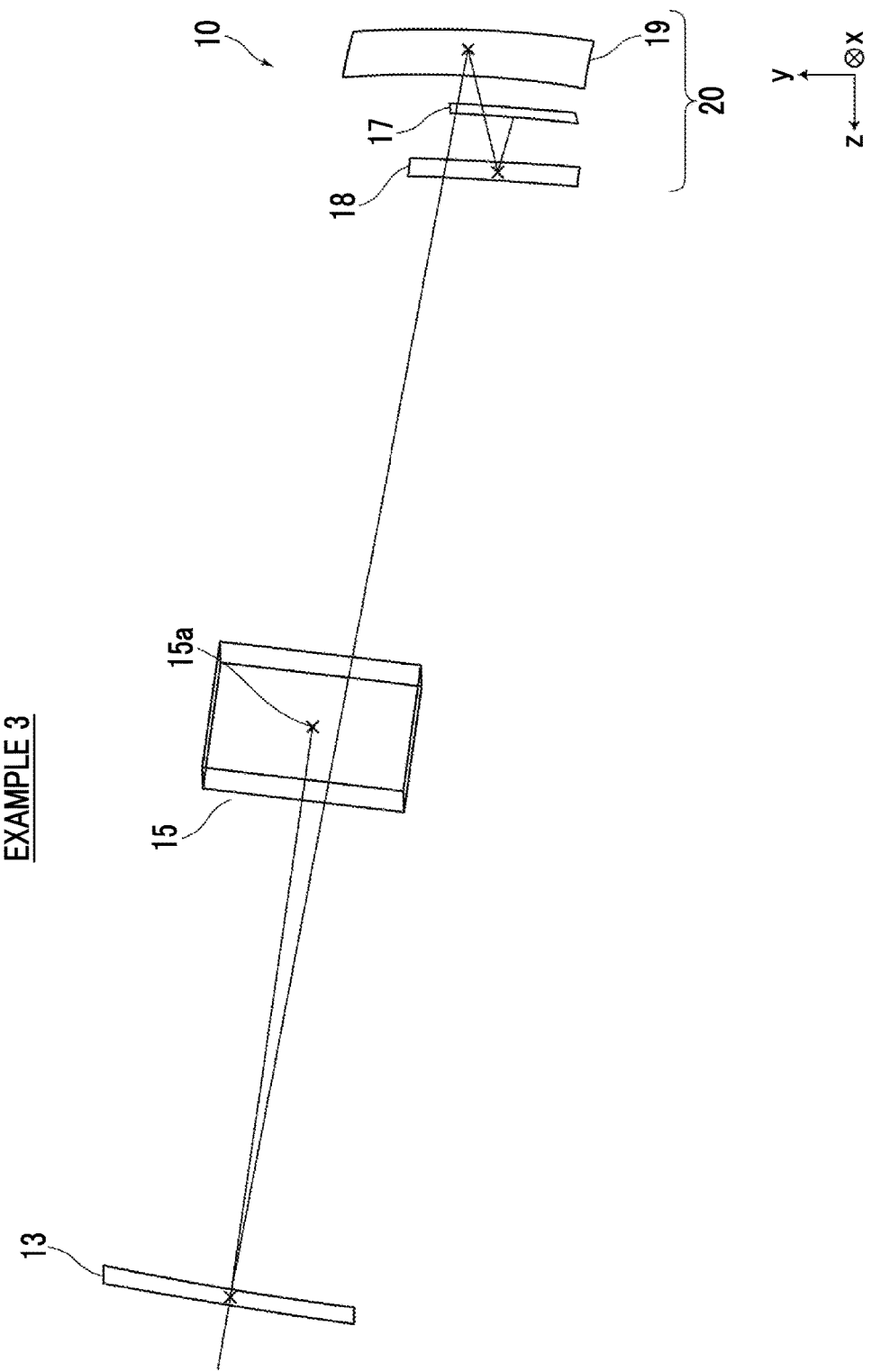
FIG. 8 is a diagram showing the schematic structure of a head-up display device of Example 3 of the invention seen in the x-axis direction.
Figure 9:
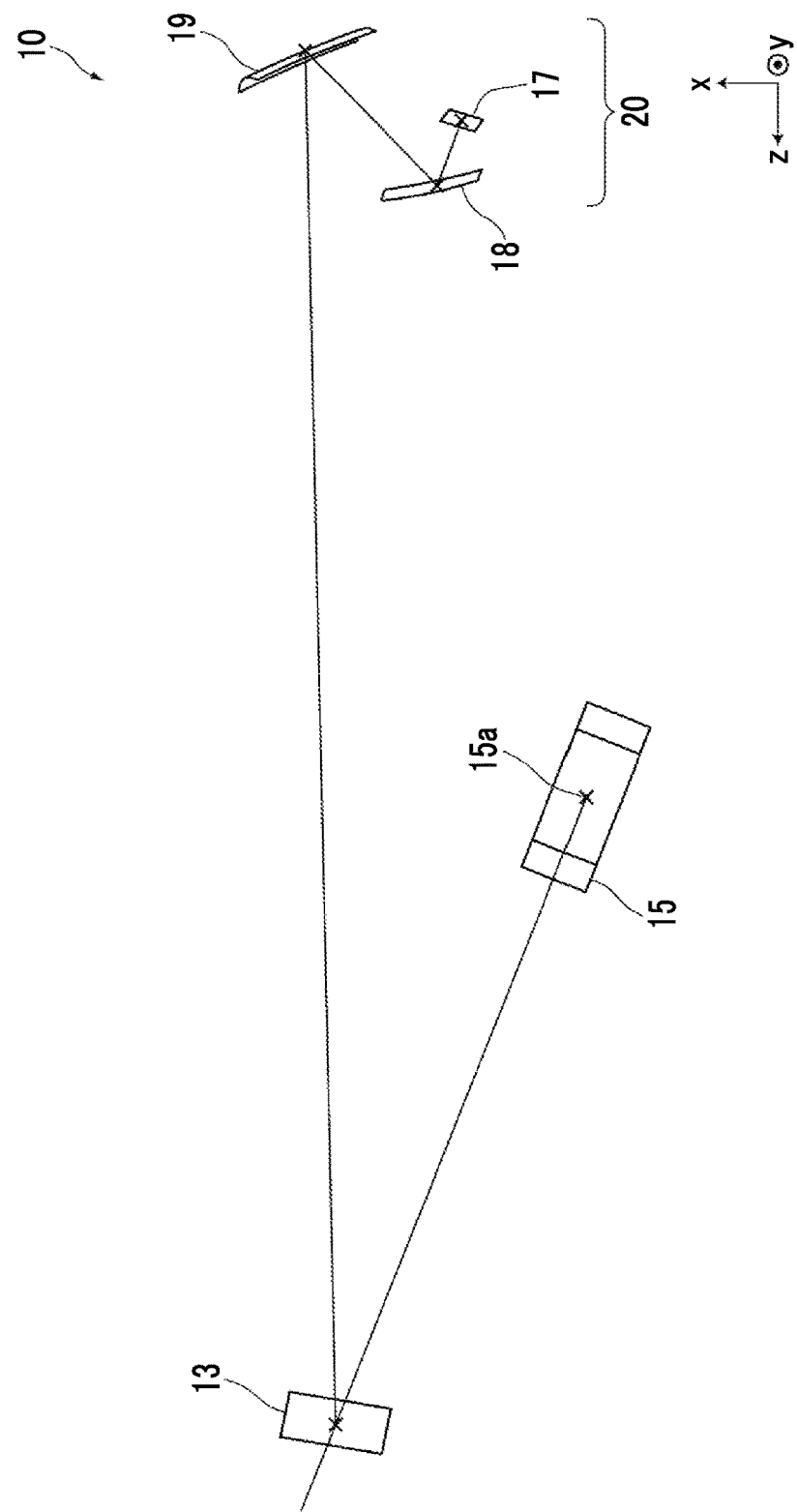
FIG. 9 is a diagram showing the schematic structure of the head-up display device of Example 3 of the invention seen in the y-axis direction.
Figure 10:
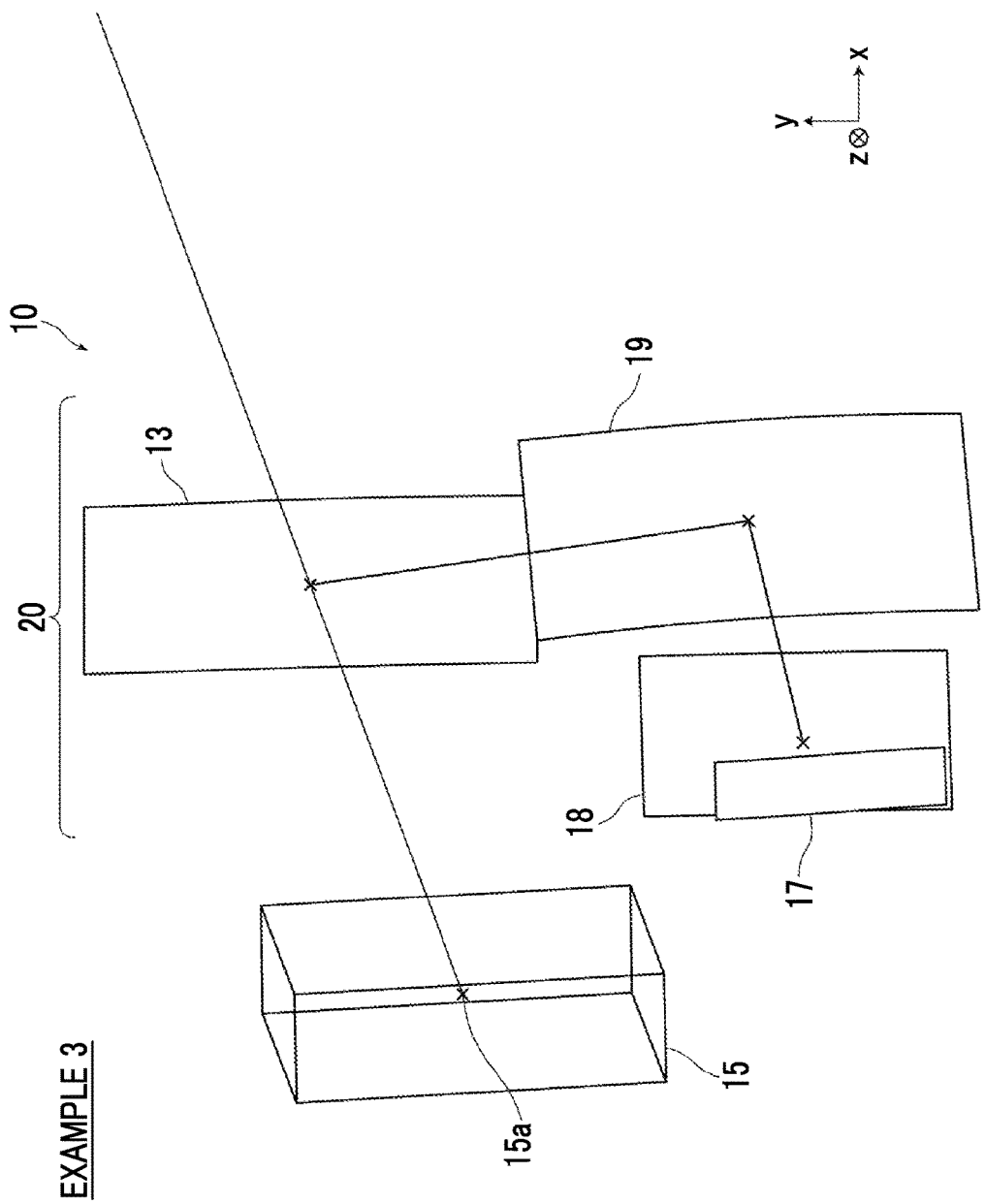
FIG. 10 is a diagram showing the schematic structure of the head-up display device of Example 3 of the invention seen in the z-axis direction.

Next, a head-up display device of Example 3 will be described. FIGS. 8 to 10 are diagrams showing the schematic structure of the head-up display device of Example 3. Further, Table 5 shows the arrangement coordinate data of the respective elements of the head-up display device of Example 3, and Table 6 shows data about the shapes of the reflective surfaces of the respective mirrors.

TABLE 5

EXAMPLE 3

| | COORDINATES OF ORIGINS OF RESPECTIVE SURFACES | | | x AXIS OF LOCAL COORDINATE SYSTEM | | | y AXIS OF LOCAL COORDINATE SYSTEM | | | z AXIS OF LOCAL COORDINATE SYSTEM | | |
|---|---|---|---|---|---|---|---|---|---|---|---|---|
| | x | y | z | Vxx | Vxy | Vxz | Vyx | Vyy | Vyz | Vzx | Vzy | Vzz |
| IMAGE DISPLAY SURFACE | 0.00 | 0.00 | 0.00 | 0.9551 | 0.0411 | −0.2935 | −0.0674 | 0.9945 | −0.0800 | 0.2886 | 0.0962 | 0.9526 |
| FIRST MIRROR | 27.50 | 20.00 | 70.00 | 0.9784 | 0.0300 | 0.2044 | −0.0184 | 0.9981 | −0.0583 | −0.2058 | 0.0533 | 0.9772 |
| SECOND MIRROR | 170.00 | 55.00 | −75.00 | −0.9174 | −0.0800 | −0.3898 | −0.0696 | 0.9967 | −0.0408 | 0.3918 | −0.0103 | −0.9200 |
| REFLECTIVE OPTICAL SURFACE | 130.09 | 338.32 | 1400.00 | 0.9848 | 0.0000 | −0.1736 | −0.0286 | 0.9863 | −0.1622 | 0.1712 | 0.1647 | 0.9714 |

TABLE 5-continued

EXAMPLE 3

| | COORDINATES OF ORIGINS OF RESPECTIVE SURFACES | | | x AXIS OF LOCAL COORDINATE SYSTEM | | | y AXIS OF LOCAL COORDINATE SYSTEM | | | z AXIS OF LOCAL COORDINATE SYSTEM | | |
|---|---|---|---|---|---|---|---|---|---|---|---|---|
| | x | y | z | Vxx | Vxy | Vxz | Vyx | Vyy | Vyz | Vzx | Vzy | Vzz |
| CENTER OF EYE BOX | −135.00 | 240.00 | 725.00 | 0.9308 | 0.0000 | −0.3655 | −0.0491 | 0.9909 | −0.1250 | 0.3622 | 0.1343 | 0.9224 |
| VIRTUAL IMAGE | 3792.26 | 1696.53 | 10725.00 | 1.0000 | 0.0000 | 0.0000 | 0.0000 | 1.0000 | 0.0000 | 0.0000 | 0.0000 | 1.0000 |

TABLE 6

EXAMPLE 3

| | FIRST MIRROR | SECOND MIRROR | REFLECTIVE OPTICAL SURFACE |
|---|---|---|---|
| C | 2.4726302179E−04 | −6.3166593843E−05 | −2.3249341810E−04 |
| $D_{20}$ | −1.0734426648E−03 | −3.8353281411E−04 | 2.7185989959E−05 |
| $D_{11}$ | −6.6908589888E−05 | −9.0823278602E−05 | −4.9965869145E−06 |
| $D_{02}$ | 2.8549088036E−05 | −4.2529484610E−04 | 1.2868375236E−05 |
| $D_{30}$ | 1.2209595685E−06 | −5.9593634185E−07 | −8.7169180708E−09 |
| $D_{21}$ | 1.0964527626E−06 | 2.6887388240E−07 | −5.3149077477E−09 |
| $D_{12}$ | 1.1615776978E−06 | 3.9898524258E−07 | −2.1868698394E−08 |
| $D_{03}$ | −2.8887176547E−07 | 5.4608114986E−08 | 6.3253009452E−09 |
| $D_{40}$ | −3.3633310599E−09 | −3.6045403941E−10 | 1.2412620919E−10 |
| $D_{31}$ | −3.9107118518E−09 | 9.0862714741E−10 | 2.7811640303E−11 |
| $D_{22}$ | 3.8567034154E−09 | −1.0774854253E−09 | 2.3702737029E−10 |
| $D_{13}$ | 6.8805106055E−10 | −2.0158211611E−10 | −1.4015983399E−12 |
| $D_{04}$ | −8.2269940505E−09 | 4.1969153761E−10 | −5.0536563392E−12 |
| $D_{50}$ | 1.7935635677E−11 | 7.6213542694E−14 | −1.5431966397E−13 |
| $D_{41}$ | 5.1238143013E−11 | −3.1548787770E−12 | −2.8641605747E−13 |
| $D_{32}$ | −8.6496061997E−11 | −1.5570532154E−11 | 1.3578335133E−12 |
| $D_{23}$ | 1.3877003664E−11 | −6.7230730515E−12 | 2.1301625386E−13 |
| $D_{14}$ | 2.4322402201E−11 | −4.9422281046E−12 | 3.3227814084E−13 |
| $D_{05}$ | 3.0567447375E−12 | 2.0822889243E−12 | −1.5566991741E−13 |
| $D_{60}$ | 1.1285454970E−14 | 1.9339719028E−15 | 2.3315508617E−17 |
| $D_{51}$ | −1.6296635098E−14 | 3.9737292174E−15 | 1.1472507208E−15 |
| $D_{42}$ | 1.3938270077E−14 | 4.3387794133E−15 | −9.2996523405E−16 |
| $D_{33}$ | 1.2049511660E−14 | 8.6977982146E−16 | 1.1691924780E−17 |
| $D_{24}$ | −1.6736902017E−14 | −7.3383997583E−15 | 7.3944331621E−16 |
| $D_{15}$ | 4.3866674952E−14 | −1.8475922993E−15 | −4.1877406020E−17 |
| $D_{06}$ | −1.2405321497E−13 | 2.9656057252E−15 | −6.8996064778E−17 |
| $D_{70}$ | 1.3097737800E−16 | 2.4939241874E−18 | 5.0495546769E−19 |
| $D_{61}$ | −1.0944079104E−16 | −6.1270309256E−19 | 2.8453049093E−18 |
| $D_{52}$ | −6.2205073038E−16 | 4.2843332468E−17 | −8.5572120312E−18 |
| $D_{43}$ | −4.9559163982E−17 | 8.6155502482E−18 | −5.8947508519E−19 |
| $D_{34}$ | −5.1921254361E−16 | −1.2974776843E−17 | 1.0991693278E−18 |
| $D_{25}$ | −2.2621302025E−16 | −4.7313505197E−18 | 1.9330040621E−18 |
| $D_{16}$ | 4.2443529757E−16 | −4.7864315214E−17 | 1.3197476762E−18 |
| $D_{07}$ | −4.0510679147E−16 | 1.2816426632E−17 | −8.6025103825E−19 |
| $D_{80}$ | 5.8794116604E−19 | −3.6118072794E−20 | −4.3779933882E−21 |
| $D_{71}$ | −6.4243904695E−19 | 2.5467120870E−19 | −7.5089047359E−21 |
| $D_{62}$ | −4.0612115247E−19 | 6.9285517971E−20 | −1.5477178063E−20 |
| $D_{53}$ | −2.3132827354E−19 | 1.9504209971E−19 | −2.3846680718E−21 |
| $D_{44}$ | −7.5837437488E−19 | −9.5328241023E−20 | −1.8332518131E−20 |
| $D_{35}$ | 8.5680766963E−20 | 1.1005359611E−19 | 5.7303209067E−21 |
| $D_{26}$ | −1.2999306815E−18 | −2.9561090410E−19 | 4.0062505040E−21 |
| $D_{17}$ | 1.5385890162E−18 | −8.8669241107E−20 | −5.9892226783E−21 |
| $D_{08}$ | −9.9373605147E−19 | 8.5101837861E−20 | −3.5454485272E−21 |

Figure 11:
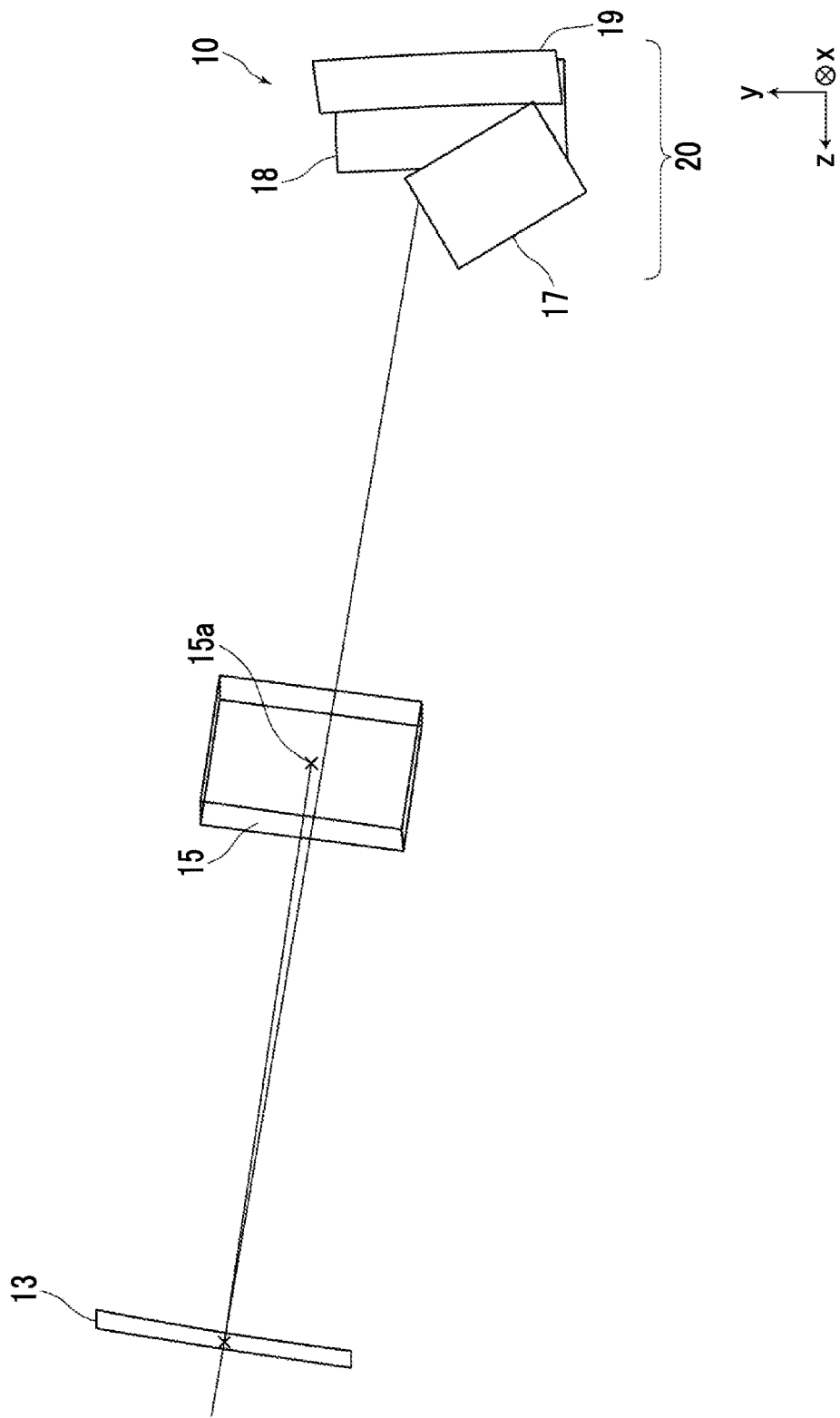
FIG. 11 is a diagram showing the schematic structure of a head-up display device of Example 4 of the invention seen in the x-axis direction.

Next, a head-up display device of Example 4 will be described. FIGS. 11 to 13 are diagrams showing the schematic structure of the head-up display device of Example 4. Further, Table 7 shows the arrangement coordinate data of the respective elements of the head-up display device of Example 4, and Table 8 shows data about the shapes of the reflective surfaces of the respective mirrors.

TABLE 7

EXAMPLE 4

| | COORDINATES OF ORIGINS OF RESPECTIVE SURFACES | | | x AXIS OF LOCAL COORDINATE SYSTEM | | | y AXIS OF LOCAL COORDINATE SYSTEM | | | z AXIS OF LOCAL COORDINATE SYSTEM | | |
|---|---|---|---|---|---|---|---|---|---|---|---|---|
| | x | y | z | Vxx | Vxy | Vxz | Vyx | Vyy | Vyz | Vzx | Vzy | Vzz |
| IMAGE DISPLAY SURFACE | 0.00 | 0.00 | 0.00 | −0.0040 | −0.8593 | −0.5114 | −0.0498 | 0.5110 | −0.8582 | 0.9988 | 0.0220 | −0.0448 |
| FIRST MIRROR | 130.00 | 48.50 | −80.00 | 0.0013 | 0.0338 | −0.9994 | −0.0709 | 0.9969 | 0.0336 | 0.9975 | 0.0708 | 0.0037 |
| SECOND MIRROR | 55.00 | 65.00 | −125.00 | −0.8705 | −0.0713 | 0.4869 | −0.0576 | 0.9974 | 0.0430 | −0.4887 | 0.0094 | −0.8724 |
| REFLECTIVE OPTICAL SURFACE | 44.00 | 318.47 | 1350.00 | 0.9815 | 0.0000 | −0.1915 | −0.0302 | 0.9875 | −0.1550 | 0.1891 | 0.1579 | 0.9692 |
| CENTER OF EYE BOX | −235.00 | 215.00 | 675.00 | 0.9242 | 0.0000 | −0.3820 | −0.0536 | 0.9901 | −0.1296 | 0.3782 | 0.1403 | 0.9150 |
| VIRTUAL IMAGE | 3898.33 | 1747.96 | 10675.00 | 1.0000 | 0.0000 | 0.0000 | 0.0000 | 1.0000 | 0.0000 | 0.0000 | 0.0000 | 1.0000 |

TABLE 8

EXAMPLE 4

| | FIRST MIRROR | SECOND MIRROR | REFLECTIVE OPTICAL SURFACE |
|---|---|---|---|
| C | −1.3874920062E−03 | −2.5746897981E−04 | −2.2241097057E−04 |
| $D_{20}$ | 7.1059333981E−05 | 4.3007817428E−05 | 8.7068975470E−06 |
| $D_{11}$ | −4.8427096875E−05 | 3.3127572851E−05 | 2.6098745563E−06 |
| $D_{02}$ | 3.7651004171E−04 | −3.8216989743E−05 | −2.1378507715E−06 |
| $D_{30}$ | 1.8127045394E−07 | 2.1452404828E−07 | −3.8641547811E−10 |
| $D_{21}$ | 7.3930417748E−07 | −2.9697671853E−07 | 9.9629355691E−09 |
| $D_{12}$ | −3.5012810969E−07 | −2.0477405977E−07 | −3.0684246904E−09 |
| $D_{03}$ | −1.7158062573E−07 | −4.5280308597E−08 | 4.1073949216E−09 |
| $D_{40}$ | −5.1979601752E−10 | −2.4357158969E−10 | 3.3744935747E−11 |
| $D_{31}$ | 4.8353709749E−09 | 3.5987168288E−09 | 2.1877424153E−11 |
| $D_{22}$ | −1.5688173195E−10 | −2.4332725190E−10 | 1.6582956136E−11 |
| $D_{13}$ | 7.5710957239E−10 | −8.5902602671E−10 | −5.3265481025E−12 |
| $D_{04}$ | −2.9726693078E−09 | 1.0167508904E−09 | 2.1555182024E−13 |
| $D_{50}$ | 2.3497957992E−11 | −1.3381200026E−12 | 1.2606133923E−13 |
| $D_{41}$ | −1.9171463826E−11 | 9.0524510612E−13 | −2.1307818233E−16 |
| $D_{32}$ | 1.8373321321E−11 | −1.5341216727E−11 | 9.0557650251E−14 |
| $D_{23}$ | −3.8445244952E−12 | −1.8099134151E−12 | −8.6892487399E−14 |
| $D_{14}$ | 5.5855812862E−12 | −1.9187659031E−12 | 3.7052683829E−15 |
| $D_{05}$ | 1.1372290021E−12 | 1.6353412454E−12 | −2.0513505411E−14 |
| $D_{60}$ | −1.3106806336E−14 | 2.8360010887E−14 | −3.0921469316E−16 |
| $D_{51}$ | 2.2503692543E−14 | −6.0222808147E−14 | 2.3518498242E−17 |
| $D_{42}$ | −1.6205183417E−13 | 3.7200372757E−14 | 5.6860410972E−16 |
| $D_{33}$ | −1.0326941468E−13 | −1.6817655869E−14 | 1.6792768221E−16 |
| $D_{24}$ | 4.4374045952E−14 | 6.9455274528E−14 | −1.2415384300E−15 |
| $D_{15}$ | 2.2066805410E−14 | −6.9185428147E−15 | −8.4674656579E−17 |
| $D_{06}$ | −1.2409372696E−15 | 9.9836216490E−15 | −3.1868829069E−17 |
| $D_{70}$ | −5.2587256957E−16 | −2.0664775322E−16 | −4.1493011047E−19 |
| $D_{61}$ | 2.5598013028E−16 | −2.5176835032E−16 | −3.6191841930E−20 |
| $D_{52}$ | −7.3376243905E−16 | 8.3391332990E−16 | 2.4393653996E−19 |
| $D_{43}$ | 3.0043948876E−17 | 1.4149821009E−16 | −2.4467902692E−19 |
| $D_{34}$ | 2.7136475244E−16 | −5.9245408730E−17 | −9.3096145236E−19 |
| $D_{25}$ | 1.9148840354E−16 | −5.1950832456E−17 | −3.5226424325E−19 |
| $D_{16}$ | −7.1345486116E−18 | 1.4591288480E−16 | −1.3791435127E−19 |
| $D_{07}$ | 1.6493391255E−17 | −8.8506592323E−18 | −1.5046023726E−19 |
| $D_{80}$ | −1.3401703164E−18 | −9.5464094033E−19 | 3.1219193456E−21 |
| $D_{71}$ | 9.5473564707E−19 | −9.6820156735E−19 | −6.5810102908E−21 |
| $D_{62}$ | 1.7529665508E−18 | 2.9970851966E−19 | 5.9836631262E−21 |
| $D_{53}$ | −1.3372707249E−18 | 1.1310200938E−18 | −2.3742523264E−21 |
| $D_{44}$ | −3.5429685942E−19 | −6.0701693777E−19 | −1.0911967212E−20 |
| $D_{35}$ | −9.8562716990E−20 | −2.1163149112E−18 | −7.2027082226E−21 |
| $D_{26}$ | 3.8960191660E−20 | −8.9873707916E−19 | −6.5038104134E−22 |
| $D_{17}$ | 2.9075338016E−19 | 7.1530136853E−19 | 1.2116249478E−22 |
| $D_{08}$ | 8.3048886705E−20 | 3.0137320048E−19 | −9.0623022861E−23 |

Values corresponding to Conditional Expressions (1) and (2) of the head-up display devices of Examples 1 to 4 are shown in Table 9.

TABLE 9

VALUES OF CONDITIONAL EXPRESSIONS

| EXPRESSION NUMBER | | EXAMPLE 1 | EXAMPLE 2 | EXAMPLE 3 | EXAMPLE 4 |
|---|---|---|---|---|---|
| | $C_{\_1}$ | 2.4496E−03 | −1.1827E−03 | 2.4726E−04 | −1.3875E−03 |
| | $C_{\_2}$ | −3.3680E−04 | −3.1274E−04 | −6.3167E−05 | −2.5747E−04 |
| | $C_{\_3}$ | −1.8124E−04 | −1.8455E−04 | −2.3249E−04 | −2.2241E−04 |
| | $D_{20\_1}$ | −1.8214E−03 | −7.0887E−05 | −1.0734E−03 | 7.1059E−05 |
| | $D_{20\_2}$ | −3.5904E−04 | −1.6183E−05 | −3.8353E−04 | 4.3008E−05 |
| | $D_{20\_3}$ | 5.2855E−06 | −4.5306E−06 | 2.7186E−05 | 8.7069E−06 |
| | $D_{02\_1}$ | −8.6098E−04 | 9.1721E−05 | 2.8549E−05 | 3.7651E−04 |
| | $D_{02\_2}$ | −3.6835E−04 | −1.4359E−04 | −4.2529E−04 | −3.8217E−05 |
| | $D_{02\_3}$ | −9.9610E−06 | −1.2760E−05 | 1.2868E−05 | −2.1379E−06 |
| | $L_1$ | 76.68931 | 155.26188 | 77.82191 | 160.16320 |
| | $L_2$ | 193.01878 | 87.78525 | 206.29166 | 89.00702 |
| | $L_3$ | 1547.87486 | 1567.72868 | 1502.49312 | 1496.66139 |
| | $\varphi_1$ | 4.6574E−04 | 2.3238E−03 | 1.5953E−03 | 1.8798E−03 |
| | $\varphi_2$ | 2.1284E−03 | 9.4503E−04 | 1.7440E−03 | 5.0536E−04 |
| | $\varphi_3$ | 3.7182E−04 | 4.0368E−04 | 3.8488E−04 | 4.3168E−04 |
| | $\varphi_{12}$ | 2.4028E−03 | 3.0760E−03 | 2.7653E−03 | 2.3006E−03 |
| (1) | $\varphi_3/|\varphi_{12}|$ | 0.1547472 | 0.1312345 | 0.1391802 | 0.1876360 |
| (2) | $\varphi_{12}*L_3$ | 3.7192157 | 4.8223757 | 4.1548774 | 3.4432875 |

It is understood from the above-mentioned data that all the head-up display devices of Examples 1 to 4 are head-up display devices capable of being improved in performance by a reduction in size and the sataisfactory correction of optical aberration since satisfyling Conditional Expressions (1) and (2).

Here, values corresponding to Conditional Expressions (1) and (2) of the head-up display device disclosed in JP2013-61554A are shown in Table 10 as Comparative Examples.

TABLE 10

RELATED ART

| EXPRESSION NUMBER | | COMPARATIVE EXAMPLE 1 | COMPARATIVE EXAMPLE 2 | COMPARATIVE EXAMPLE 3 |
|---|---|---|---|---|
| | $C_{\_1}$ | 6.4103E−03 | 4.8248E−03 | −4.8249E−03 |
| | $C_{\_2}$ | −3.7037E−03 | 0.0000E+00 | 1.0000E+02 |
| | $C_{\_3}$ | 0.0000E+00 | −1.5480E−03 | −3.0000E+02 |
| | $D_{20\_1}$ | | | |
| | $D_{20\_2}$ | | | |
| | $D_{20\_3}$ | | | |
| | $D_{02\_1}$ | | | |
| | $D_{02\_2}$ | | | |
| | $D_{02\_3}$ | | | |
| | $L_1$ | 65.00000 | 31.00000 | 42.00000 |
| | $L_2$ | 80.00000 | 92.00000 | 71.00000 |
| | $L_3$ | 120.00000 | 110.00000 | 90.00000 |
| | $\varphi_1$ | −1.2821E−02 | −9.6496E−03 | 9.6497E−03 |
| | $\varphi_2$ | 7.4074E−03 | 0.0000E+00 | −2.0000E+02 |
| | $\varphi_3$ | 0.0000E+00 | 3.0960E−03 | 6.0000E+02 |
| | $\varphi_{12}$ | 2.1842E−03 | −9.6496E−03 | −6.2964E+01 |
| (1) | $\varphi_3/|\varphi_{12}|$ | 0.0000000 | 0.3208411 | 9.5292001 |
| (2) | $\varphi_{12}*L_3$ | 0.2621083 | −1.0614516 | −5666.7925424 |

Since all head-up display devices of Comparative Examples 1 to 3 do not satisfy Conditional Expressions (1) and (2) from the above-mentioned data, the same effects as the effects of the invention cannnot be obtained.

The invention has been described using the embodiment and Examples. However, the invention is not limited to the embodiment and Examples and may have various modifications. Both the first and second mirrors have positive power in Examples 1 to 4. However, Conditional Expression (1) can be satisfied even though any one of the first and second mirrors may have negative power in the invention. Further, for example, the positions and sizes of the respective elements of the head-up display device may have other values without being limited to values that are mentioned in Examples of numerical values.

EXPLANATION OF REFERENCES

10: head-up display device
11: bus
12: dashboard
13: combiner (reflective optical surface)
14: front window
15: eye box 15a: center of eye box
16: virtual image
17: image display surface
18: first mirror
19: second mirror
20: projection optical system
P: observer (driver)

What is claimed is:

1. A head-up display device comprising:
a projection optical system that projects an image displayed on an image display surface to a reflective optical surface disposed at a position facing an predetermined observation position of an observer and allows the observer to visually recognize the enlarged image as a virtual image,
wherein in a case in which an optical path, which extends from a center of the image display surface and reaches a center of an eye box, is referred to as an optical axis, the projection optical system includes a first mirror and a second mirror in this order from the image display surface and Conditional Expression (1) is satisfied, $$0.05 < \varphi_3/|\varphi_{12}| < 0.3 \tag{1}$$

where, $\varphi_3$: power of the reflective optical surface near the optical axis, and
$\varphi_{12}$: power of a combined optical system of the first and second mirrors, and
wherein Conditional Expression (2) is satisfied, $$2 < \varphi_{12} * L_3 < 10 \tag{2}$$

where, $L_3$: a gap between the second mirror and the reflective optical surface on the optical axis.

2. The head-up display device according to claim 1,
wherein an angle of luminous flux toward the reflective optical surface from the projection optical system is made variable by movement of at least one mirror selected from the first and second mirrors.

3. The head-up display device according to claim 1,
wherein the angle of luminous flux toward the reflective optical surface from the projection optical system is made variable by movement of the mirror, which is disposed at a position closest to the center of the eye box, of the first and second mirrors.

4. The head-up display device according to claim 1,
wherein the image is an image that is formed as an intermediate image on the basis of image information by an optical system.

5. The head-up display device according to claim 4, further comprising:
a diffuser that is provided on the image display surface present at a formation position of the intermediate image.

6. The head-up display device according to claim 1,
wherein Conditional Expression (1-1) is satisfied, $$0.1 < \varphi_3/|\varphi_{12}| < 0.2 \tag{1-1}$$

7. The head-up display device according to claim 1,
wherein Conditional Expression (2-1) is satisfied, $$3 < \varphi_{12} * L_3 < 5 \tag{2-1}$$

where, $L_3$: a gap between the second mirror and the reflective optical surface on the optical axis.

* * * * *